United States Patent
Puvvada et al.

(10) Patent No.: US 11,704,289 B2
(45) Date of Patent: Jul. 18, 2023

(54) ROLE REVERSAL OF PRIMARY AND SECONDARY SITES WITH MINIMAL REPLICATION DELAY

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Ashish Pandey, Pune (IN); Saket Kumar, Bettiah (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 17/368,050

(22) Filed: Jul. 6, 2021

(65) Prior Publication Data
US 2023/0008978 A1 Jan. 12, 2023

(51) Int. Cl.
*G06F 16/178* (2019.01)
*G06F 11/14* (2006.01)
*G06F 3/06* (2006.01)

(52) U.S. Cl.
CPC ........... *G06F 16/178* (2019.01); *G06F 3/065* (2013.01); *G06F 3/067* (2013.01); *G06F 3/0619* (2013.01);
(Continued)

(58) Field of Classification Search
CPC ...... G06F 16/178; G06F 3/0619; G06F 3/065; G06F 3/067; G06F 11/1464; G06F 2201/84
See application file for complete search history.

(56) References Cited

U.S. PATENT DOCUMENTS 8,818,951 B1 * 8/2014 Muntz ................. G06F 16/1827
707/639
10,613,793 B1 * 4/2020 Hu .......................... G06F 3/065
(Continued)

OTHER PUBLICATIONS

Mell et al., "Effectively and Securely the Cloud Computing Paradigm" dated Oct. 7, 2009, NIST Information Technology Laboratory, Total 80 pages.
(Continued)

*Primary Examiner* — Alford W Kindred
*Assistant Examiner* — Tiffany Thuy Bui
(74) *Attorney, Agent, or Firm* — Konrad Raynes Davda & Victor LLP; Janaki K. Davda

(57) ABSTRACT

Provided are techniques for role reversal of primary and secondary sites with minimal replication delay. During a backup phase, an Input/Output (I/O) operation selected from a group comprising a create operation and a rename operation is received with one or more local attributes of a local file. The I/O operation is processed to generate one or more remote attributes. The one or more local attributes are stored with the one or more remote attributes. During a reversed phase, a write operation for the remote file is processed, and, the write operation is sent to the primary replication system with the one or more local attributes, where the primary replication system uses a local file handle in the one or more local attributes to access the local file for processing the write operation to sync the local file with the remote file.

20 Claims, 22 Drawing Sheets

(52) U.S. Cl.
CPC ...... *G06F 11/1464* (2013.01); *G06F 2201/84* (2013.01)

(56) References Cited

U.S. PATENT DOCUMENTS

| | | | |
|---|---|---|---|
| 10,649,862 B1 | 5/2020 | Sure et al. | |
| 11,055,123 B1* | 7/2021 | Bin | G06F 9/5077 |
| 11,206,305 B1* | 12/2021 | Eberlein | G06F 16/278 |
| 2004/0250030 A1* | 12/2004 | Ji | G06F 3/0613 714/E11.107 |
| 2006/0031594 A1* | 2/2006 | Kodama | G06F 11/2069 710/5 |
| 2015/0317220 A1 | 11/2015 | Sampath et al. | |
| 2018/0196831 A1* | 7/2018 | Maybee | G06F 11/3495 |
| 2019/0340091 A1* | 11/2019 | Chandrasekaran | H04L 63/08 |
| 2019/0370135 A1 | 12/2019 | Salapura et al. | |
| 2020/0026794 A1* | 1/2020 | Chen | G06F 11/1461 |
| 2020/0042633 A1* | 2/2020 | Schneider | G06F 11/1443 |
| 2020/0117750 A1 | 4/2020 | Chen et al. | |
| 2020/0183800 A1 | 6/2020 | Lyu et al. | |
| 2020/0233581 A1* | 7/2020 | Chen | G06F 3/0653 |
| 2021/0232464 A1* | 7/2021 | Su | G06F 16/178 |
| 2022/0229905 A1* | 7/2022 | Kumar | G06F 21/561 |

OTHER PUBLICATIONS

Mell et al., "The NIST Definition of Cloud Computing" dated Sep. 2011, Computer Security Division, Information Technology Laboratory, Information Technology Laboratory (NIST), Total 7 pages.

IBM "Mounting A Remote GPFS File System" (online) retrieved from the internet on Jun. 18, 2021, from URL>https://www.ibm.com/docs/en/spectrum-scale/5.1.0, Total 8 pages.

Wikipedia, "Inode" (online) retrieved from the Internet on Jun. 1, 2021, from URL>https://en.wikipedia.org/wiki/Inode, Total 6 pages.

Anonymous, "Minimal Data Loss in Disaster-Struck Disaster Recovery Solution During Role Reversal" dated May 14, 21, an IP.com Prior Art Database Technical Disclosure, IP.com No. IPCOM000265797D, Total 10 pages.

* cited by examiner

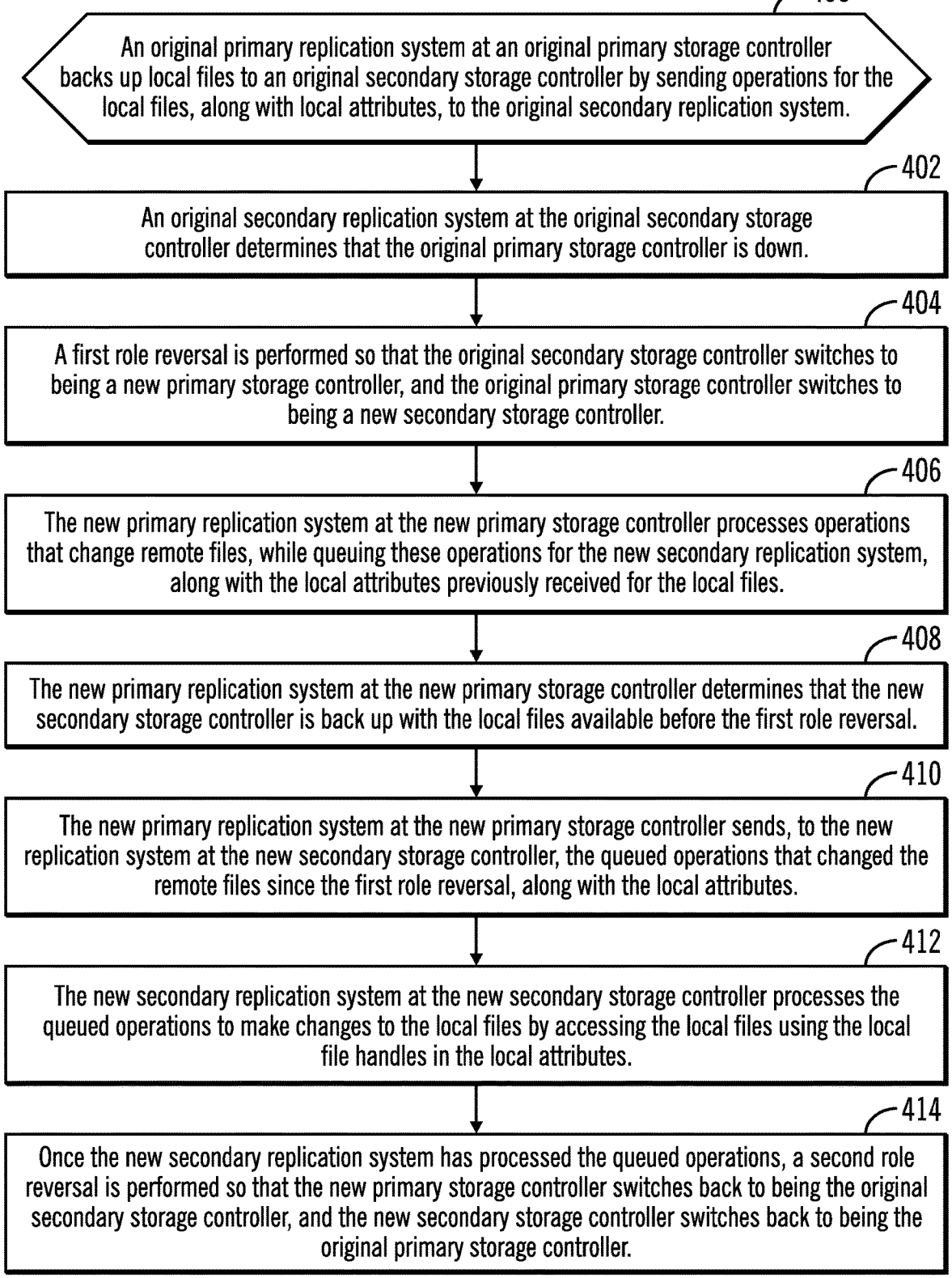

ROLE REVERSAL OF PRIMARY AND SECONDARY SITES WITH MINIMAL REPLICATION DELAY

BACKGROUND

Embodiments of the invention relate to role reversal of primary and secondary sites with minimal replication delay. In particular, embodiments of the invention relate to role reversal of primary (production) and secondary (disaster recovery or backup) sites with close to zero replication delay to ensure minimum data loss in a disaster recovery setup.

Data storage systems are usually designed to provide a high level of redundancy to reduce the risk of data loss in the event of failure of production site storing data. Thus, the data at the production site may be replicated to a backup site. At any given time, the backup site has most of the data of the production site (e.g., the backup site has approximately 95% of the data of the production site, with some loss of data that is in queue at the production site that was not sent to the backup site before the production site failed, while meeting a Recovery Point Objective (RPO)). The production site and the backup site may each have clusters of storage controllers.

In a typical case of failure of the production site (original production site), failover to the backup site occurs. That is, the backup site becomes the new production site, and users may continue with applications accessing the data at the new production site (original backup site).

Later, when the original production site comes back up, there are two possibilities for the user to move over applications from the new production site back to the original production site: a snapshot solution and a role reversal solution.

With the snapshot solution, the new production site (original backup site) creates a snapshot based on a list of differences since the time the original production site failed and sends that snapshot over to the original production site, which then fetches the data that is different over to itself in phases, and the applications may be cutover and moved back to the original production site after one final difference fetch by the original production site after cutover. Then, the original production site reverts to being the production site again, and the new production site reverts to being the backup site. The snapshot may be removed.

However, creating the actual differences may be time consuming as it is single threaded and goes over a large number of inodes to fetch the changes, then the original production site has to fetch the data over in phases, while the applications are making changes at the new, failed over production site.

With the role reversal solution, the original production site becomes a new backup site, and the failed over, new production site (original backup site) is available for applications making changes. The role reversal ensures that the data modifications are synched inline when they are being made at the production itself. The user's task is to identify a maintenance window to allow all data to be in sync (i.e., the queue of changes becomes empty) such that a second role reversal may be performed in order that both the setups get their original roles and continue forward. This solution performs an inode scan on a snapshot created for re-synchronizing the data at the current production site over to the backup site, which uses memory and local disk space.

SUMMARY

In accordance with certain embodiments, a computer-implemented method is provided for role reversal of primary and secondary sites with minimal replication delay. The computer-implemented method comprises operations. During a backup phase, an Input/Output (I/O) operation selected from a group comprising a create operation and a rename operation is received with one or more local attributes of a local file in a primary storage, where a remote file in a secondary storage comprises a counterpart of the local file. The I/O operation is processed to generate one or more remote attributes. The one or more local attributes of the local file are stored with the one or more remote attributes of the remote file, where the one or more local attributes include a local file handle for the local file. During a reversed phase in which a primary replication system associated with the primary storage has become unavailable, a write operation for the remote file is processed, and, in response to determining that the primary replication system has become available, the write operation is sent to the primary replication system with the one or more local attributes, where the primary replication system uses the local file handle in the one or more local attributes to access the local file for processing the write operation to sync the local file with the remote file.

In accordance with other embodiments, a computer program product is provided for role reversal of primary and secondary sites with minimal replication delay. The computer program product comprises a computer readable storage medium having program code embodied therewith, the program code executable by at least one processor to perform operations. During a backup phase, an Input/Output (I/O) operation selected from a group comprising a create operation and a rename operation is received with one or more local attributes of a local file in a primary storage, where a remote file in a secondary storage comprises a counterpart of the local file. The I/O operation is processed to generate one or more remote attributes. The one or more local attributes of the local file are stored with the one or more remote attributes of the remote file, where the one or more local attributes include a local file handle for the local file. During a reversed phase in which a primary replication system associated with the primary storage has become unavailable, a write operation for the remote file is processed, and, in response to determining that the primary replication system has become available, the write operation is sent to the primary replication system with the one or more local attributes, where the primary replication system uses the local file handle in the one or more local attributes to access the local file for processing the write operation to sync the local file with the remote file.

In accordance with yet other embodiments, a computer system is provided for role reversal of primary and secondary sites with minimal replication delay. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. During a backup phase, an Input/Output (I/O) operation selected from a group comprising a create operation and a rename operation is received with one or more local attributes of a local file in a primary storage, where a remote file in a secondary storage comprises a counterpart of the local file. The I/O operation is processed to generate one or more remote attributes. The one or more local attributes of the local file are stored with the one or more remote attributes of the remote file, where the one or more local attributes include a local file handle for the local file. During a reversed phase in which a primary replication system associated with the primary storage has become unavailable, a write operation for the remote file is processed, and, in response to determining that the primary replication system has become available, the write operation is sent to the primary replication system with the one or more local attributes, where the primary replication system uses the local file handle in the one or more local attributes to access the local file for processing the write operation to sync the local file with the remote file.

BRIEF DESCRIPTION OF THE SEVERAL VIEWS OF THE DRAWINGS

Referring now to the drawings in which like reference numbers represent corresponding parts throughout:

FIG. 4 illustrates, in a flowchart, operations when a primary site is down in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1A:
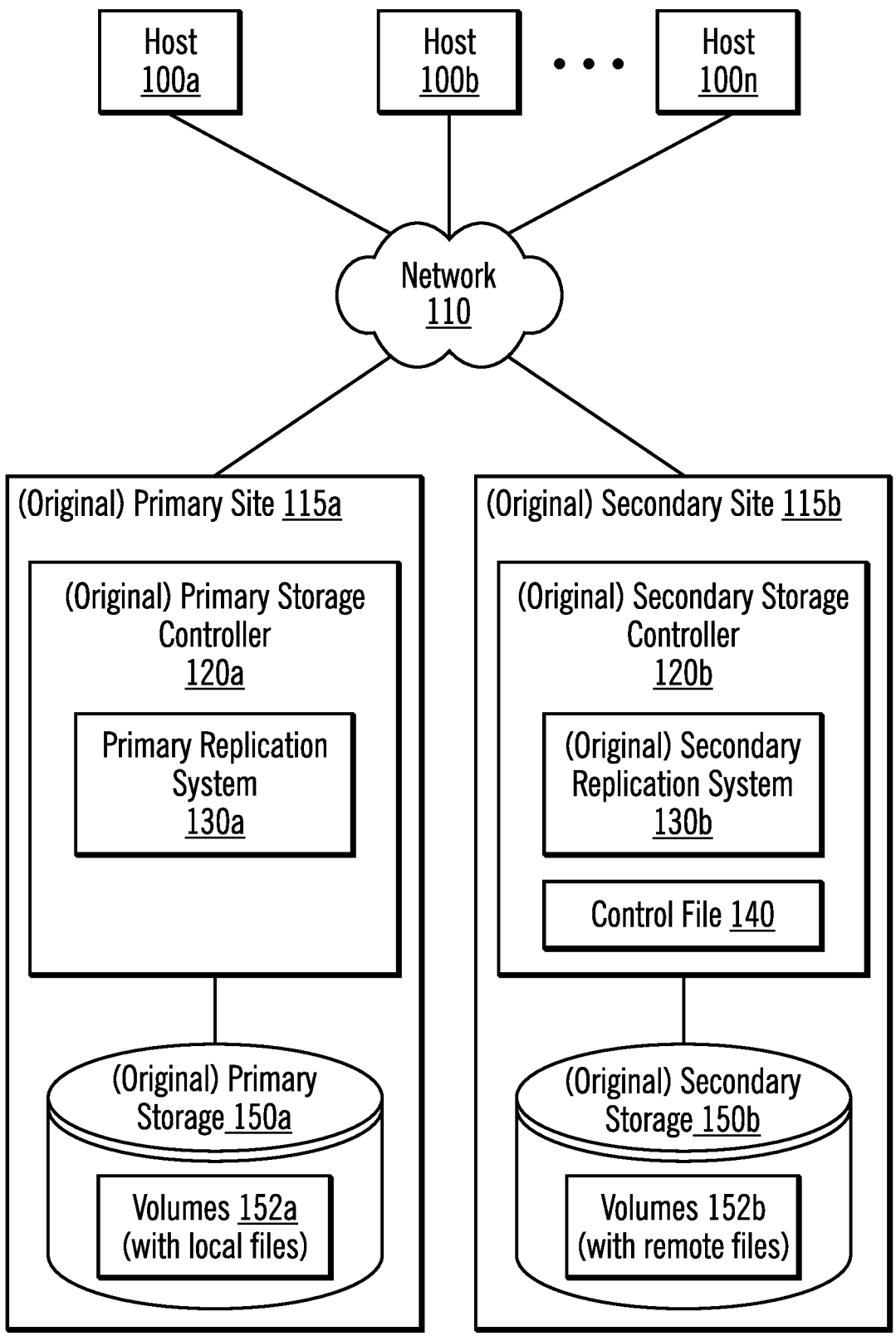
FIG. 1A illustrates, in a block diagram, a computing environment with original primary and secondary sites in accordance with certain embodiments.

FIG. 1A illustrates, in a block diagram, a computing environment with original primary and secondary sites in accordance with certain embodiments. In FIG. 1A, a plurality of hosts 100a, 100b, . . . 100n are coupled, via a network 110, to a primary storage controller 120a of a primary site 115a and to a secondary storage controller 120b of a secondary site 115b. The primary storage controller 120a includes a replication system 130a, while the secondary storage controller 120b includes a replication system 130b. In certain embodiments, the replication systems 130a, 130b are types of storage managers. The plurality of hosts 100a, 100b, . . . 100n may submit Input/Output (I/O) operations to the storage controllers (or storage control units) 120a, 120b over the network 110 to access data at volumes 152a in primary storage 150a and volumes 152b in secondary storage 150b. The volumes may be, for example, Logical Unit Numbers, Logical Devices, Logical Subsystems, etc. The primary storage 150a and the secondary storage 150b may be storage drives.

The secondary storage controller 120b includes a control file 140. The control file 140. In certain embodiments, an I/O operation on the control file is interpreted as meaning that the original secondary site is to store the given file handle as an extended attribute on the remote inode provided for the remote file.

In one embodiment, the 1 primary storage and the secondary storage 150a, 150b are storage devices and may be comprised of one or more sequential access storage devices, such as hard disk drives and magnetic tape or may include non-sequential access storage devices such as solid state drives (SSD), for example. Each storage device may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

In FIG. 1A, although one storage controller 120a, 120b are illustrated at each of the primary and secondary sites, the primary site and the secondary site may each have clusters of storage controllers.

In FIG. 1A, the storage controller 120a and the storage 150a have been configured as a primary storage control unit and the primary storage, respectively, of a primary site 115a. The storage controller 120b and the data storage 150b have been configured as a secondary storage control unit and a secondary storage, respectively, of a secondary site 115b.

In a particular copy relationship, the source unit is often referred to as the primary, and the target unit is often referred to as the secondary. Copy relationships are defined between storage units of the data storage 150a and 150b. Notwithstanding a reference to the data storage 150a as "primary" (or "production") and the data storage 150b as "secondary" (or "disaster recovery"), particular storage units of the data storage 150a, 150b may play both a source role and a target role depending upon the particular copy relationship.

As noted above, the computing environment includes one or more hosts 100a, 100b, . . . 100n writing updates to the primary storage controller 120a for storage in the primary storage 150a.

With embodiments, the primary storage controller 120a is located at a first site, and the secondary storage controller 120b is located at a second site. The first site and the second site may be geographically or functionally apart from the each other. Thus, in such embodiments, the first site may be at a local site and the second site may be at a geographically remote site separated by a short or long geographical distance from the local site and from each other. Alternatively, the local and remote sites may be relatively close, such as in different buildings in the same general geographical location, in different rooms of the same building, in different machines in the same room, or in different portions or partitions of the same machine, of the network 110.

The system components 100a, 100b, . . . 100n, 120a, 120b, 150a, 150b are connected to the network 110, which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 100a, 100b, 100n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 1B:
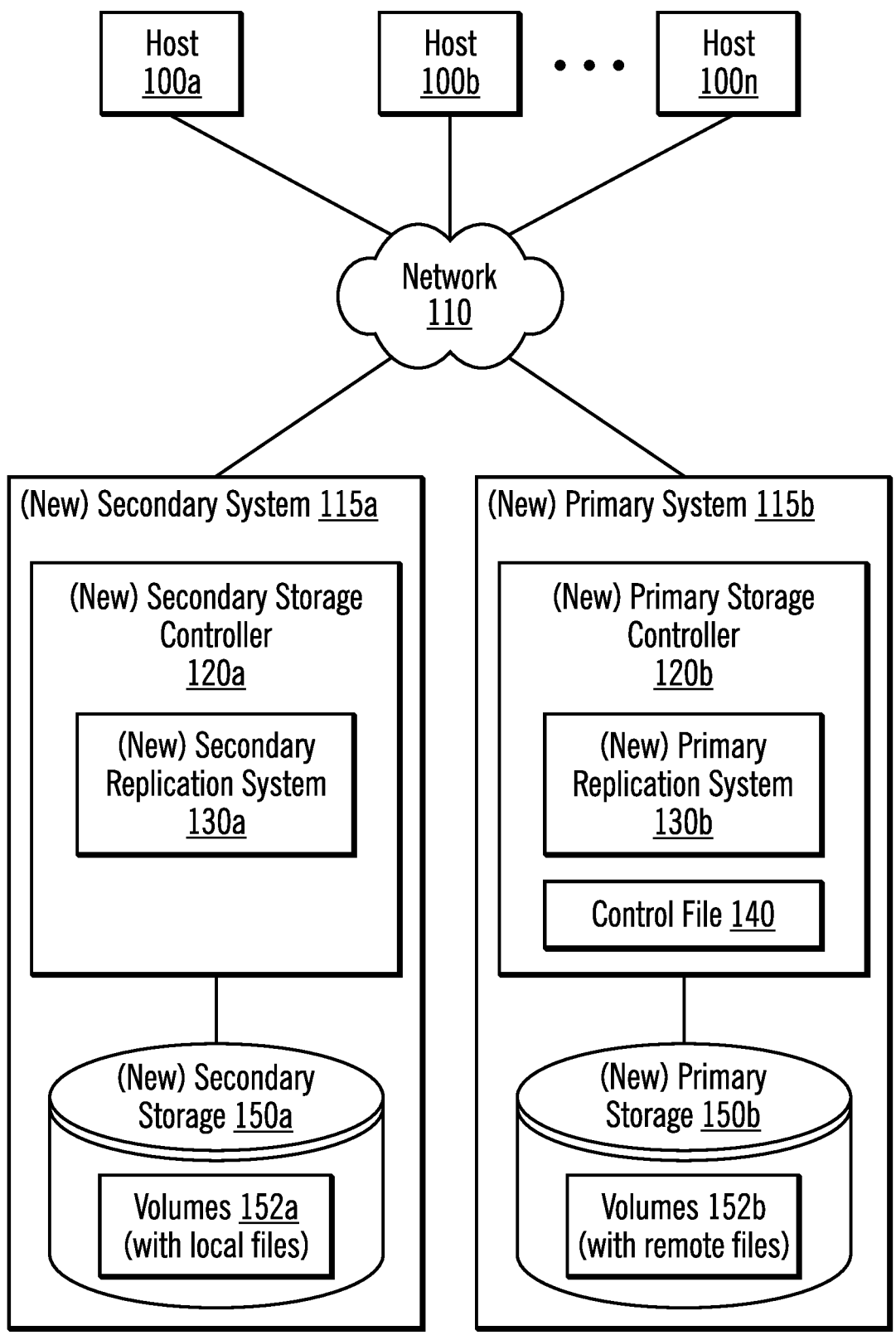
FIG. 1B illustrates, in a block diagram, a computing environment with new primary and secondary sites in accordance with certain embodiments.

FIG. 1B illustrates, in a block diagram, a computing environment with new primary and secondary sites in accordance with certain embodiments. With embodiments, if the primary site fails, embodiments advantageously switch to the secondary site, which becomes the new primary (production) system. When, the primary site is available again, it becomes the new secondary (disaster recovery or backup) system. In FIG. 1B, the original primary site becomes the new secondary site, while the original secondary site becomes the new primary site. In FIG. 1B, a plurality of hosts 100a, 100b, . . . 100n are coupled, via a network 110, to a secondary storage controller 120a of a secondary site 115a and to a primary storage controller 120b of a primary site 115b. The secondary storage controller 120a includes a replication system 130a, while the primary storage controller 120b includes a replication system 130b. The plurality of hosts 100a, 100b, . . . 100n may submit I/O operations to the storage controllers (or storage control units) 120a, 120b over the network 110 to access data at volumes 152a in secondary storage 150a and volumes 152b in primary storage 150b.

With embodiments, there may be an unplanned role reversal or a planned role reversal. With an unplanned role reversal, a disaster may strike the original primary site, then there is an immediate (no downtime) approach to move applications to the original secondary site by performing a failover (which is almost immediate). Then, the applications continue to execute against data at the new primary site (the original secondary site). Later when the original primary site is back up and available for applications, the roles are reversed again, the new primary site syncs up with the new secondary site, and the new secondary site becomes the original primary site again.

With a planned role reversal, the user (e.g., an administrator) keeps both the primary site and the secondary sites up-to-date in terms of data, with the RPO in place before the roles are reversed. In this case, the inodes are in sync between the primary and secondary sites, but the secondary site may not be aware of local details of the primary site.

In certain embodiments, each of the hosts 100a, 100b, . . . 100n may each include a monitor program, an operating system, and an application. The monitor program monitors failures in the availability of the primary storage controller 120a and the primary storage 150a. The application reads data from and writes updates to a storage controller 120a, 120b respectively to, the primary storage 150a or the secondary storage 150b.

Figure 2:
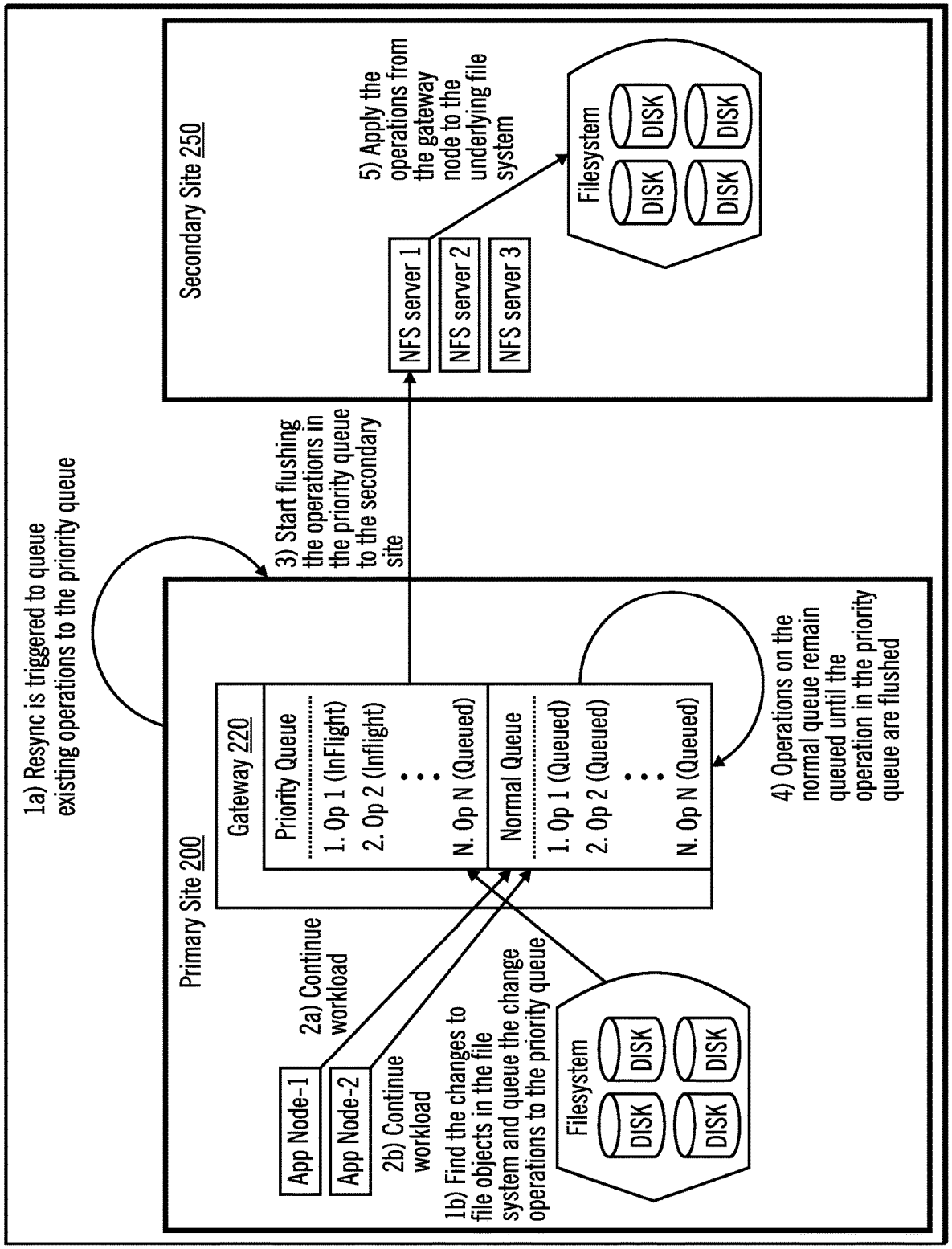
FIG. 2 illustrates, in a block diagram, a gateway between a primary site and a secondary site in accordance with certain embodiments.

FIG. 2 illustrates, in a block diagram, a gateway 220 between a primary site 200 and a secondary site 230 in accordance with certain embodiments. In FIG. 2, operations at the primary site 200 are queued either in a priority queue or a normal queue at the gateway 220 until they are flushed (sent) to the secondary site 250 for processing. Similarly, the secondary site 250 may use the same or another gateway to send operations to the primary site 200, for example, once role reversal has occurred.

The file has an index node (inode), a generation number, and a file handle. In a file system, the inode has an inode number and may be described as a data structure that describes a file object (a given file, directory, or other file object). For a file, the inode stores the attributes and disk block locations of the file's data. For example, the inode stores (or points to) a file size, a creation time, an access time, a modification time (mtime), a change time, a create indicator (e.g., a bit), and a dirty indicator (e.g., a bit). In addition, with embodiments, the inode stores one or more extended attributes.

Figure 3:
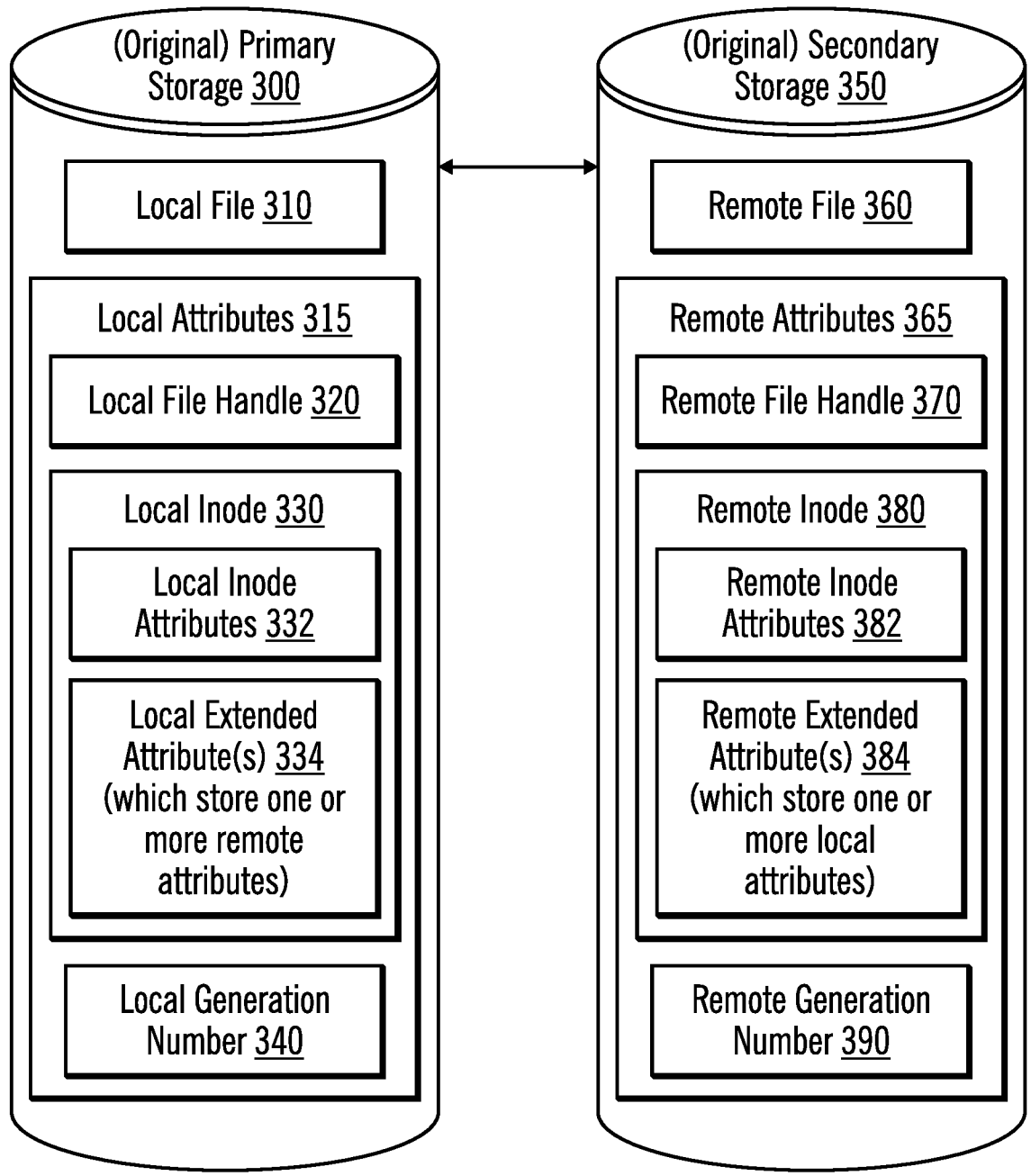
FIG. 3 illustrates, in a block diagram, attributes of a file in accordance with certain embodiments.

FIG. 3 illustrates, in a block diagram, attributes of a file in accordance with certain embodiments. At the original primary storage 300, a local file 310 has a local file handle 320, a local inode 330, and a local generation number 340. The local inode 330 stores (or points to) local inode attributes 332 (e.g., a file size, a creation time, an access time, a modification time, a change time, a create indicator, and a dirty indicator) and one or more local extended attributes 334.

At the original secondary storage 350, a remote file 360 (i.e., a counterpart file) has a remote file handle 370, a remote inode 380, and a remote generation number 390. The remote inode stores (or points to) remote inode attributes 382 (e.g., a file size, a creation time, an access time, a modification time, a change time, a create indicator, and a dirty indicator) and one or more remote extended attributes 384. The remote file 360 is a copy (e.g., for disaster recovery or other reason) of the local file 310.

In certain embodiments, the one or more local extended attributes of the local inode 330 include the remote file handle 370, the remote inode 380, and the remote generation number 390, while the one or more remote extended attributes of the remote inode include the local file handle 320, the local inode 330, and the local generation number 340. In certain other embodiments, the local extended attribute of the local inode 330 is the remote file handle 370, while the remote extended attribute of the remote inode 380 is the local file handle 320.

Although the terms local and remote are used, the term local refers to the original primary storage, while the term remote refers to the original secondary storage. In some embodiments, the terms local and remote indicate geographic distance, while in other embodiments, the terms local and remote do not indicate geographic distance.

The file handle may provide a path to the file. Also, the file handle may be described as a temporary reference (e.g., a number) assigned (e.g., by an operating system) to a file that is created or renamed, and this file handle may be used throughout a session to access the file.

With embodiments, if the create indicator is set to a first value (e.g., 1), then the file has been created, but not replicated, and, if the create indicator is set to a second value (e.g., 0), then the file has been created and replicated. With embodiments, if the dirty indicator is set to a first value (e.g., 1), then the data of the file has changed and has to be replicated, and if the dirty indicator is set to a second value (e.g., 0), then the data of the file has not changed and replication is not needed.

With embodiments, the original secondary site stores the local file handle of the file, then, when operations (e.g., create, rename or write operations) are sent from the new (reversed) primary site (the original secondary site), the secondary site sends the operations with the local file handle, which makes it easier for the new (reversed) secondary site (the original primary site) to locate the file. In this manner, embodiments provide an alternative to building file handles when an original primary site goes down and comes back up.

With embodiments, the file handle of a given file, directory, or other file object ("entities" or "file objects") depends on multiple aspects of the file (e.g., the inode number, a generation number, and a File System ID (FSID) that may be used for export through a Network File System (NFS), if there is an NFS secondary site).

In certain embodiments, for a native file system backend, there is a function in the underlying file system that returns a file handle to uniquely identify the file object over a mount that is done. In certain embodiments, since both the primary site (production/source) and secondary site (backup/target) are clustered file systems of the same type, the primary file system generates the file handle for the inode of the file at the secondary site based on the secondary inode number (generated at the secondary site) and secondary generation number (generated at the secondary site).

In certain embodiments, for an NFS backend server node, the NFS server node at the original primary site (i.e., production/source cluster) is designated ahead of time so that, during a disaster or planned role reversal, a given storage controller node of a cluster of storage controller nodes takes over as the NFS server. The thought is that if the NFS server is designated ahead of time at the primary site, and exports are put in place with the right set of FSIDs as expected by NFS, then, the gateway node in the primary site may make a temporary mount of the local export from within the primary site and fetch the NFS file handles of interest generated by the NFS server.

Once these file handles are available, they may be attached to files with the create operation or the rename operation sent to the original secondary site from the original production site, such that the secondary counterpart of each file, directory or other file object has a corresponding file handle available from the original primary site. Now, during the role reversal scenario, there is no need for queueing a large number of operations (e.g., billions of them based on the number of inodes). Instead, embodiments run a recovery process (during a reversed phase) that identifies the changed file objects at the new primary site (original secondary site), and I/O recovery operations (e.g., a recovery create operation, a recovery rename operation or a recovery write operation) for these changed file objects are sent back to the new secondary site (original primary site). In certain embodiments, a recovery create operation is a create operation received during the reversed phase, a recovery rename operation is a rename operation received during the reversed phase, and a recovery write operation is a write operation received during the reversed phase.

In certain embodiments, this calls for a Portable Operating System Interface (POSIX) operation to transfer the file handle from the gateway node on the original primary site over to the original secondary site. Since POSIX is limited to a pre-determined set of operations list, embodiments use extended attributes to handle special file system specific requirements like these.

In certain embodiments, in order to be able to do this, the original secondary site has a special file, which may be described as a control file (CTL file). The control file is like any other file in the file system, except that, when an I/O operation is done to this file via NFS/Native Filesystem backends, the I/O operation on the file is interpreted as file system specific administrative commands at the original secondary site. Both the original primary site and the original secondary site are aware of this control file. The original primary site is aware of which offset to write to and what data size to write to, and the secondary site, recognizes that an I/O operation received for that given offset for a given chunk size of data means a certain operation.

In certain embodiments, the I/O operation on the control file is interpreted as meaning that the original secondary site is to store the local file handle as an extended attribute on the inode provided for the file. In certain embodiments, this is done as part of set attribute (e.g., setAttr/setXAttr) type of operations that the original primary site does with the original secondary site as part of replicating original primary site changes to the secondary site counterpart. The set attribute operations write content to the attributes. Also, a get attribute (e.g., getxattr( ) operation retrieves the attribute, while a list attributes (e.g., listxattr( ) operation lists the attributes.

In certain embodiments, a special write call is implemented such that, when a write at a certain offset for a certain sized chunk comes on the control file from the original primary site, the original secondary site stores the transferred file handle key-value pair on the inode of the file.

In certain embodiments, the create operation and the rename operation generates the file handle (since these are the operations that may impact inode numbers or generation numbers) by performing the I/O operation on the control file to transfer the file handle from one site to another site. In addition, embodiments consider a recovery write operation or a failover write class operation (which is triggered during failure scenarios), in order to be able to generate the file handle of the inode at the original primary site and transfer the file handle over to the original secondary site.

In certain embodiments, the recovery write, recovery create, and recovery rename operations that are performed during failover (after the first role reversal until the second role reversal).

For the native General Parallel File System backend (through a remote cluster mounted filesystem from the original secondary site on the original primary site), both the primary and secondary sites are of the same file system type. In such embodiments, the file handle generation task uses a simple function on the original primary site's gateway node that is able take the inode number and the generation number of the given file object at the original primary site and be able to generate the file handle. This file handle may be transferred to the secondary site through the create/rename operation's setAttr/setXAttr calls through the control file.

In doing this, embodiments ensure that the reversal of roles between the primary and secondary sites is almost immediate, without having a large number of operations queued up to obtain the file handles of files that are already in sync between the primary and secondary sites. Instead, embodiments queue the changes made to file objects at the new primary site (original secondary site) while the original primary site was down. Once the existing changes are sent to the new secondary site (the original primary site), embodiments make way for the live changes that keep happening at the new primary site (original secondary site).

This eases the amount of data loss that may happen if there is a full queue of all the inodes on the entire fileset/filesystem. The disaster recovery drills become much faster, and there may be zero data needed to be synched in case of a planned role reversals for disaster recovery drills. With embodiments, the disaster recovery drills may be done once in two weeks or a month, as compared to conventional disaster recovery that includes a planning phase for a week with the least production to ensure minimal loss of data.

With embodiments, there may be a few files, directories or file objects that had file handles changed because of modifications done at the original primary site (new secondary site) before the disaster struck. In such a case, if the new primary site tries to use the file handle that it has or if the new primary site does not have a file handle (e.g., if the set attribute operation (setAttr) following a create operation was missed), then embodiments build the file handle on the fly for the file objects as and when the file objects are encountered by recreating the file objects at the original primary site from the new primary site and generating the latest file handle. This avoids having to queue all inodes just to have a few inodes (e.g., 1% of the inodes) be in proper sync with the file handles. Thus, embodiments build/recreate the file objects on the fly as and when encountered.

With embodiments, planned role reversals do not require any snapshot creation or policy runs to identify changed files. Instead, users may stop applications at an original primary site, ensure that the queue is in sync at the original secondary site, reverse the roles of the sites, and continue the applications on the new primary site.

In addition, with embodiments, unplanned role reversals may use a snapshot creation and a policy run. However, the policy run is to identify changed file objects at the reverse production, without queuing all inodes. The unchanged files may continue to be used, with knowledge about each of their counterpart file objects at the new secondary site (original primary site).

In addition, with embodiments, there are no snapdiffs created or applied to obtain differences of the files from the primary and secondary sites.

With embodiments, two back-to-back role reversals are performed to resume applications on the original primary site. The second role reversal is planned and (close to) zero downtime. The first role reversal may be either planned or unplanned, depending on what is to be achieved.

With embodiments, the original primary site sends the local attributes, which include the local inode number, the local generation number, and the file local handle (generated by the primary storage controller) to the original secondary site during normal processing of I/O operations and normal backup to the original secondary site. Having these local attributes at the original secondary site provides a performance enhancement during the role reversal procedure by allowing the new primary site (original secondary site) to send changes to file objects since the role reversal to the new secondary site (original primary site), while providing the new secondary site (original primary site) with the local attributes for ease of accessing the file in the new secondary storage (original primary storage) with the file handle. Thus, embodiments utilize the file handles generated by the original primary site (new secondary site) for a data transfer from the new primary site (original secondary site).

The process of replicating, that is, copying data between the primary stie and the secondary site may be set up in either a synchronous or an asynchronous relationship between the primary site and the secondary site. In a synchronous relationship, any updates to the primary site are typically synchronized with the secondary site, that is, successfully copied over to the secondary site, before the primary site reports to the host that the data storage I/O operation has been successfully completed. As a result, data storage to a primary storage system and a secondary site in a synchronous relationship may adversely affect system performance of the host while the host awaits completion of the synchronous copy operations. In storage systems in which the primary and secondary sites are widely separated, delays to completion of the synchronous copy operations may be greater, which can further adversely affect host performance. For example, in storage systems in which the primary site and the secondary site are separated by a geographical distance of 300 kilometers (Km) or more, for example, there can be a delay of 3-5 seconds (or more) before the data is successfully replicated at the secondary site.

Storage systems may employ an asynchronous relationship between a primary site and a secondary site, particularly if the secondary site is geographically distant from the primary site. In an asynchronous relationship, successful updates to the primary site are typically reported to the host as a successful storage I/O operation without waiting for the update to be replicated to the secondary site. As a result, the host need not wait for the data replication to the secondary site to be completed, and the performance of the host system may be enhanced accordingly.

As the name suggests, in an asynchronous relationship, the primary site and the secondary site may not be fully synchronized at any one time. Thus, data stored on the secondary site typically lags that stored in the primary site. Accordingly, new data stored on a primary site may not be stored on the secondary site for an interval of time such as 3-5 seconds, for example.

With data replication systems, the data being generated at the primary site is being continuously backed up to the secondary site in real time, with a slight delay, which is based on a configuration parameter (e.g., an asynchronous delay parameter). The asynchronous delay parameter is used so that a certain number of data blocks may be accumulated so that the data blocks may be sent ("played") in an operation, such as a write operation, to the secondary site from the primary site's queue. Also, the delay ensures that operations may be filtered out within the primary site's queue before the operations are attempted to be sent to the secondary site.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

One example of the copy operation is a near instantaneous copy of a volume that may be generated using a point-in-time copy function such as the IBM® FlashCopy® function, for example. (IBM and FlashCopy are registered trademarks or common law marks of International Business Machines Corporation in the United States and/or other countries.) The point-in-time copy function creates a "snapshot" of the contents of a source volume as of a particular point-in-time in a target volume which may be referred to as the point-in-time copy volume.

Another example of the copy operation is a Peer-to-Peer Remote Copy (PPRC) function that supports the concept of a PPRC consistency group. Volumes in a PPRC relationship that are configured into a PPRC consistency group are maintained to ensure that a group of updates made to volumes at the primary site are also eventually made on the volumes at the secondary site to maintain data consistency for those volumes of the group. Accordingly, consistency groups may be formed between volumes of the primary site and the secondary site which are consistent with respect to a particular set of updates or a particular point in time, notwithstanding the overall asynchronous relationship between the primary site and the secondary site.

FIG. 4 illustrates, in a flowchart, operations when a primary site is down in accordance with certain embodiments. Control begins at block 400 with the original primary replication system at an original primary storage controller backing up local files to an original secondary storage controller by sending operations (create, rename or write operations) for the local files, along with local attributes (e.g., the local file handle, the local inode, and the local generation number), to the original secondary replication system.

In block 402, an original secondary replication system at the original secondary storage controller determines that the original primary storage controller is down (i.e., not available to process request from applications executing at the hosts). The original primary storage controller going down may be planned or unplanned. For example, the original primary storage controller may be down due to some failure of the storage controller, due to being taken down for maintenance, etc.

In block 404, a first role reversal is performed so that the original secondary storage controller switches to being a new primary storage controller, and the original primary storage controller switches to being a new secondary storage controller.

In block 406, the new primary replication system at the new primary storage controller processes operations (create, rename, and write operations (e.g., from the hosts)) that change the remote files, while queuing (or otherwise saving) these create, rename, and write operations for the new secondary replication system to process later, along with the local attributes previously received for the local files (before the role reversal).

In block 408, the new primary replication system at the new primary storage controller determines that the new secondary storage controller is back up with the local files available before the first role reversal. That is, the new secondary storage controller (original primary storage controller) comes back up with the data (e.g., files and directories) it had when it went down.

In block 410, the new primary replication system at the new primary storage controller sends, to the new replication system at the new secondary storage controller, the queued operations that changed the remote files since the first role reversal, along with the local attributes. That is, the changes to the remote files, which occurred after the first role reversal, are sent to the new replication system at the new secondary storage controller for application to the local files to sync the two sites.

In block 412, the new secondary replication system at the new secondary storage controller processes the queued operations to make changes to the local files by accessing the local files using the local file handles in the local attributes.

In block 414, once the new secondary replication system has processed the queued operations, a second role reversal is performed so that the new primary storage controller switches back to being the original secondary storage controller, and the new secondary storage controller switches back to being the original primary storage controller.

At any given time, the backup site has most of the data of the production site (e.g., the backup site has approximately 95% of the data of the production site, with some loss of data that is in queue at the production site that was not sent to the backup site before the production site failed). In certain embodiments, during role reversals, although most of the data is in sync between the original, failed primary site and the new primary site (the original secondary site), there may be operations queued at the new primary site (original secondary site) to the original primary site to build file handles and verify that the data is intact.

With embodiments, the original primary site is a production site, and the original secondary site is a receiver of data (e.g., in an active passive model of disaster recovery). Failover may be described as switching the original secondary site to being the new primary site when the original primary site is down. Whatever data the original secondary site has at failover has come from the original primary site. In certain embodiments, the data may be incomplete in terms of replication from the original primary site, but the data is not invalid. The new primary site operates with the data it has, and embodiments avoid trying to sync back everything during role reversal (i.e., a double sync up). Instead, the new data that is generated and any data that gets modified in the new primary site is replicated to the new secondary site. With embodiments, this is taken care of with a recovery operation instead of running a complete sync between the two sites.

Figure 5A:
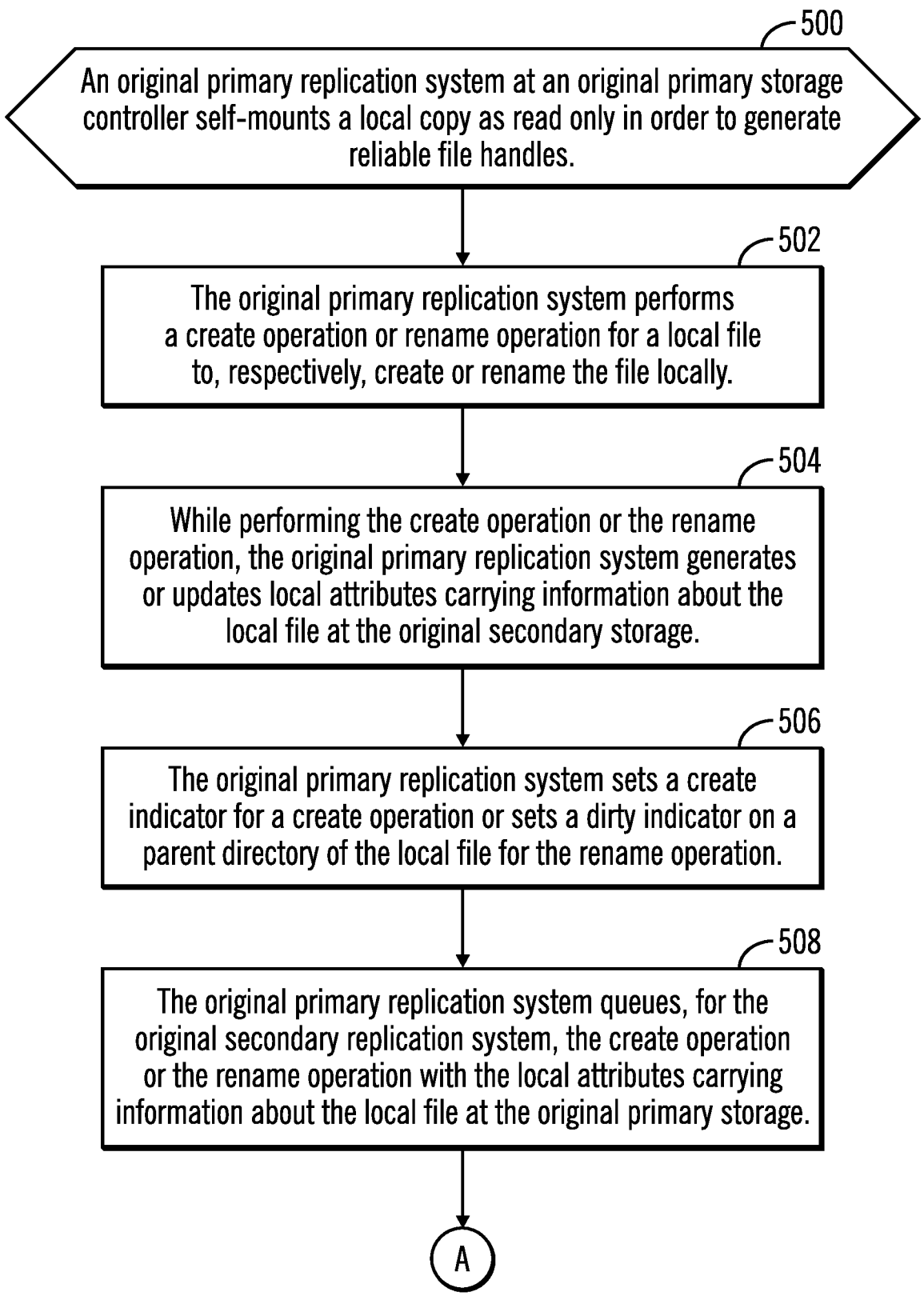
FIGS. 5A and 5B illustrate, in a flowchart, operations for an original primary site replicating data, along with local attributes, to an original secondary site in accordance with certain embodiments.
Figure 5B:
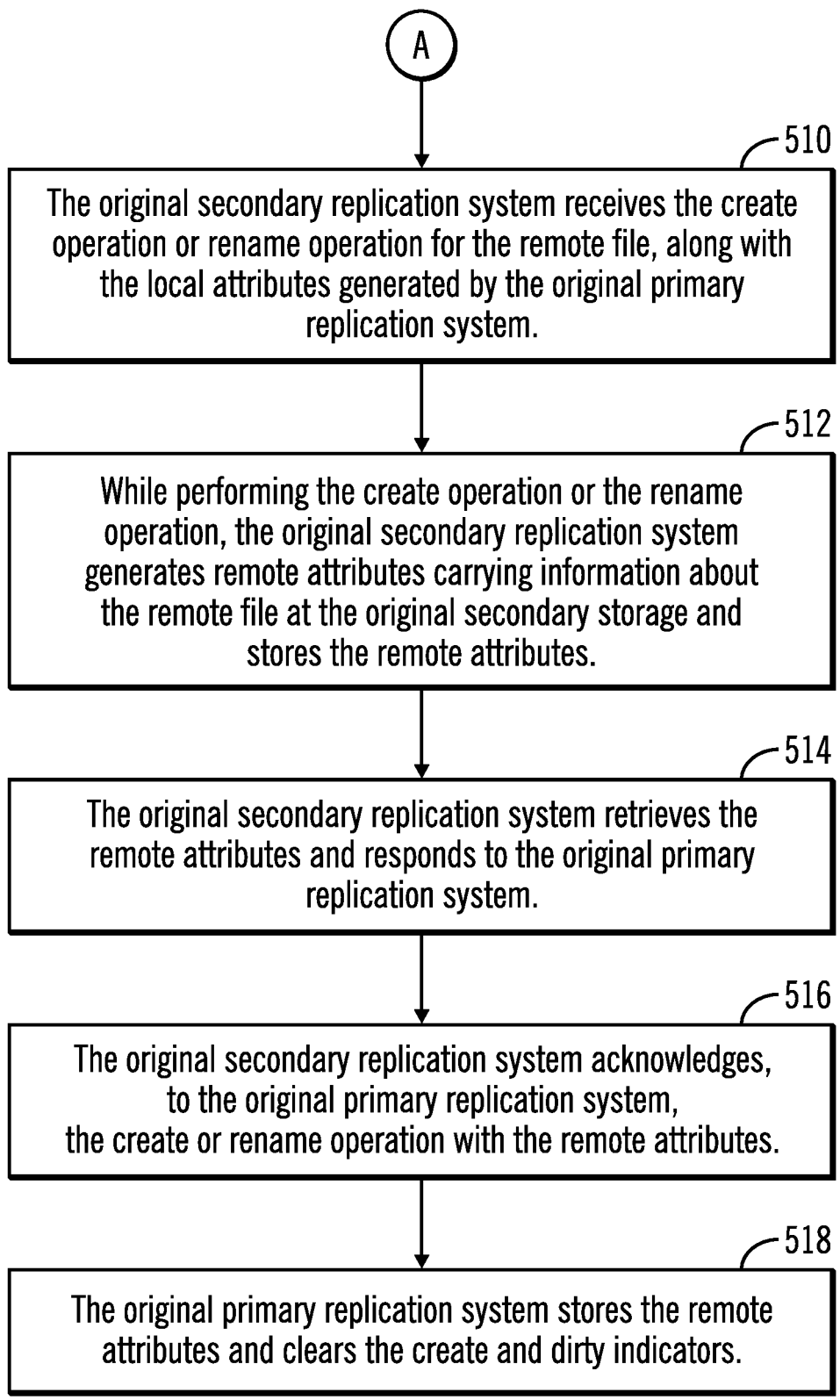

FIGS. 5A and 5B illustrate, in a flowchart, operations for an original primary site replicating data, along with local attributes, to an original secondary site in accordance with certain embodiments. Control begins at block 500 with an original primary replication system at original primary storage controller self-mounting a local copy as read only in order to generate reliable file handles. Self-mounting or mounting a local copy may be described as making a local copy of the data that is read only. Mounting the local copy may be described as making a storage device or file system accessible by attaching the storage device or the filesystem to an existing directory structure, and access is via that directory structure.

In block 502, the original primary replication system performs a create operation or rename operation for a local file to, respectively, create or rename the file locally. In block 504, while performing the create operation or the rename operation, the original primary replication system generates (for the create operation) or updates (for the rename operation) local attributes carrying information about the local file at the original secondary storage. This includes generating or updating a local inode and storing the local inode in the original primary storage. At this point, the one or more local extended attributes of the local inode are empty since remote attributes have not been received yet.

In block 506, the original primary replication system sets a create indicator for a create operation or sets a dirty indicator on a parent directory of the local file for the rename operation. In block 508, the original primary replication system queues, for the original secondary replication system, the create or rename operation with the local attributes carrying information about the local file (or local inode) at the original primary storage. From block 508 (FIG. 5A), processing continues to block 510 (FIG. 5B).

In block 510, the original secondary replication system receives the create operation or rename operation for the remote file, along with the local attributes generated by the original primary replication system.

In block 512, while performing the create operation or the rename operation, the original secondary replication system generates (for the create operation) or updates (for the rename operation) remote attributes carrying information about the remote file at the original secondary storage. This includes generating or updating a remote inode and storing the remote inode in the original secondary storage.

In block 514, the original secondary replication system retrieves the remote attributes of the remote file and responds to the original primary replication system. In block 516, the original secondary replication system acknowledges, to the original primary replication system, the create or rename operation with the remote attributes. In block 518, the original primary replication system stores the remote attributes (by storing the remote attributes in the local extended attributes of the local inode) and clears the create and dirty indicators. At this time, the local extended attributes hold the remote attributes of the counterpart file in the original secondary storage.

Figure 6:
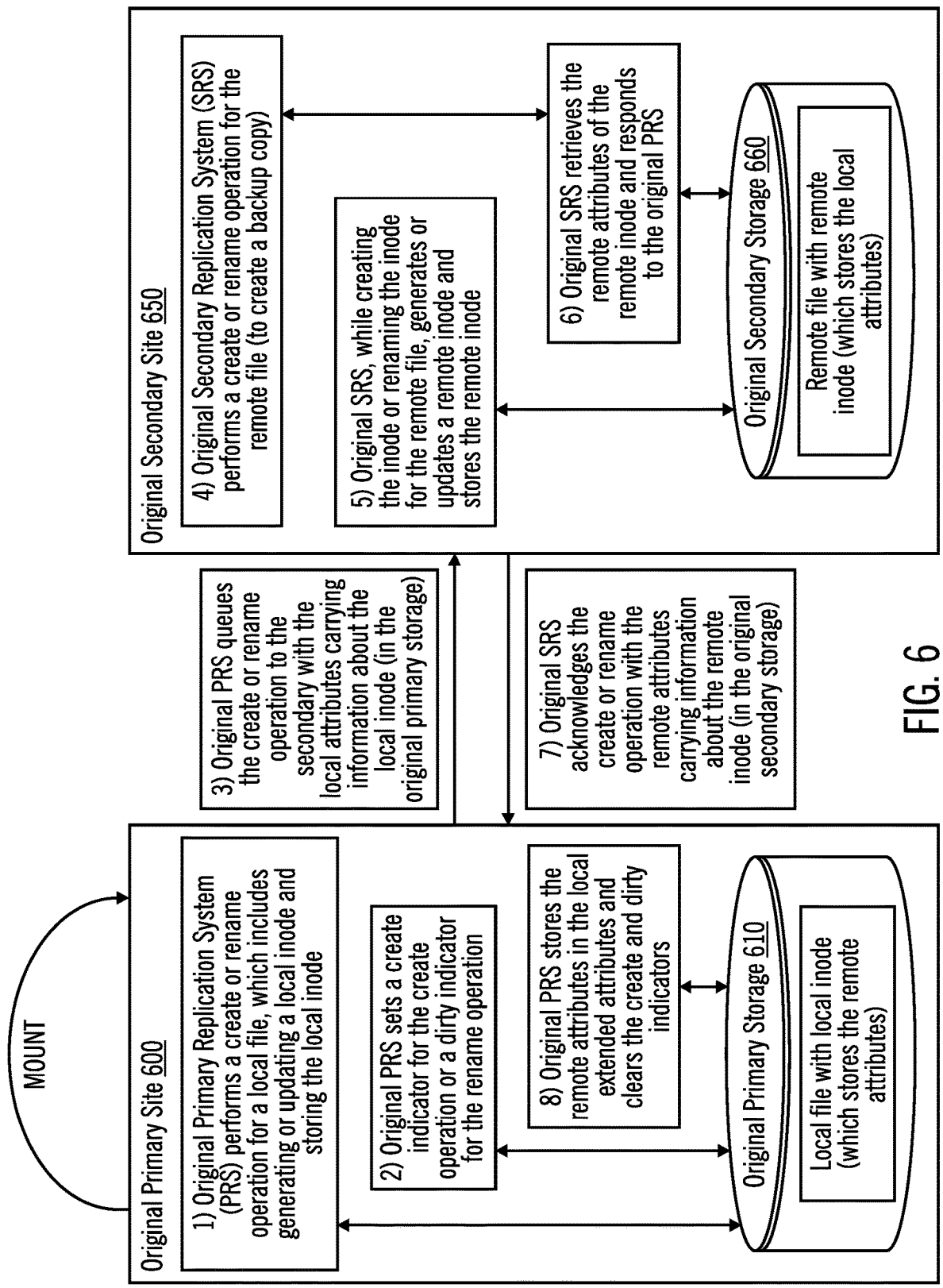
FIG. 6 illustrates, in a block diagram, operations for an original primary site replicating data to an original secondary site in accordance with certain embodiments.

FIG. 6 illustrates, in a block diagram, operations for an original primary site replicating data to an original secondary site in accordance with certain embodiments. In particular, FIG. 6 illustrates the operations of FIGS. 5A and 5B in accordance with certain embodiments.

Figure 7A:
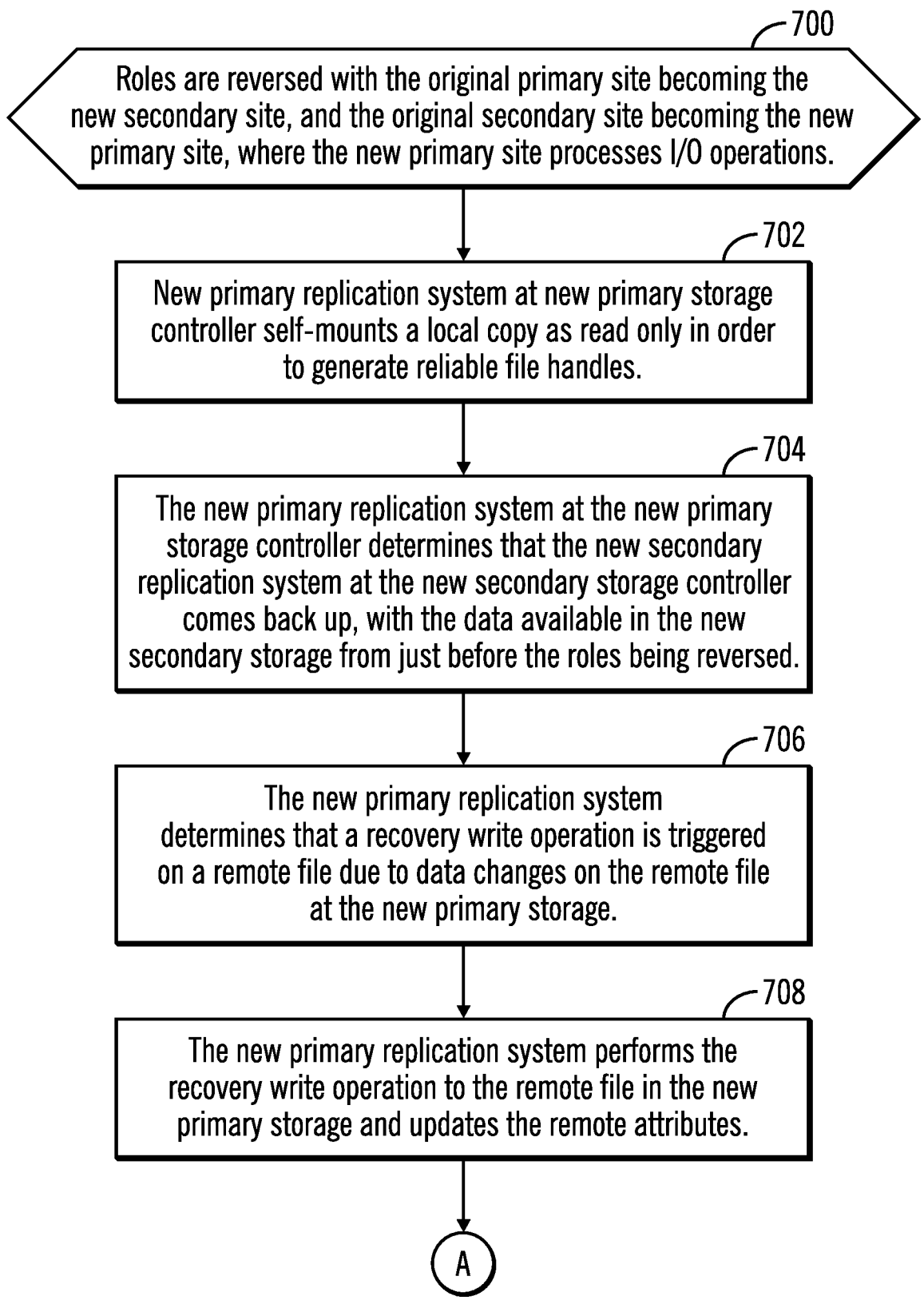
FIGS. 7A and 7B illustrate, in a flowchart, operations for a role reversal and processing of a recovery write operation in accordance with certain embodiments.
Figure 7B:
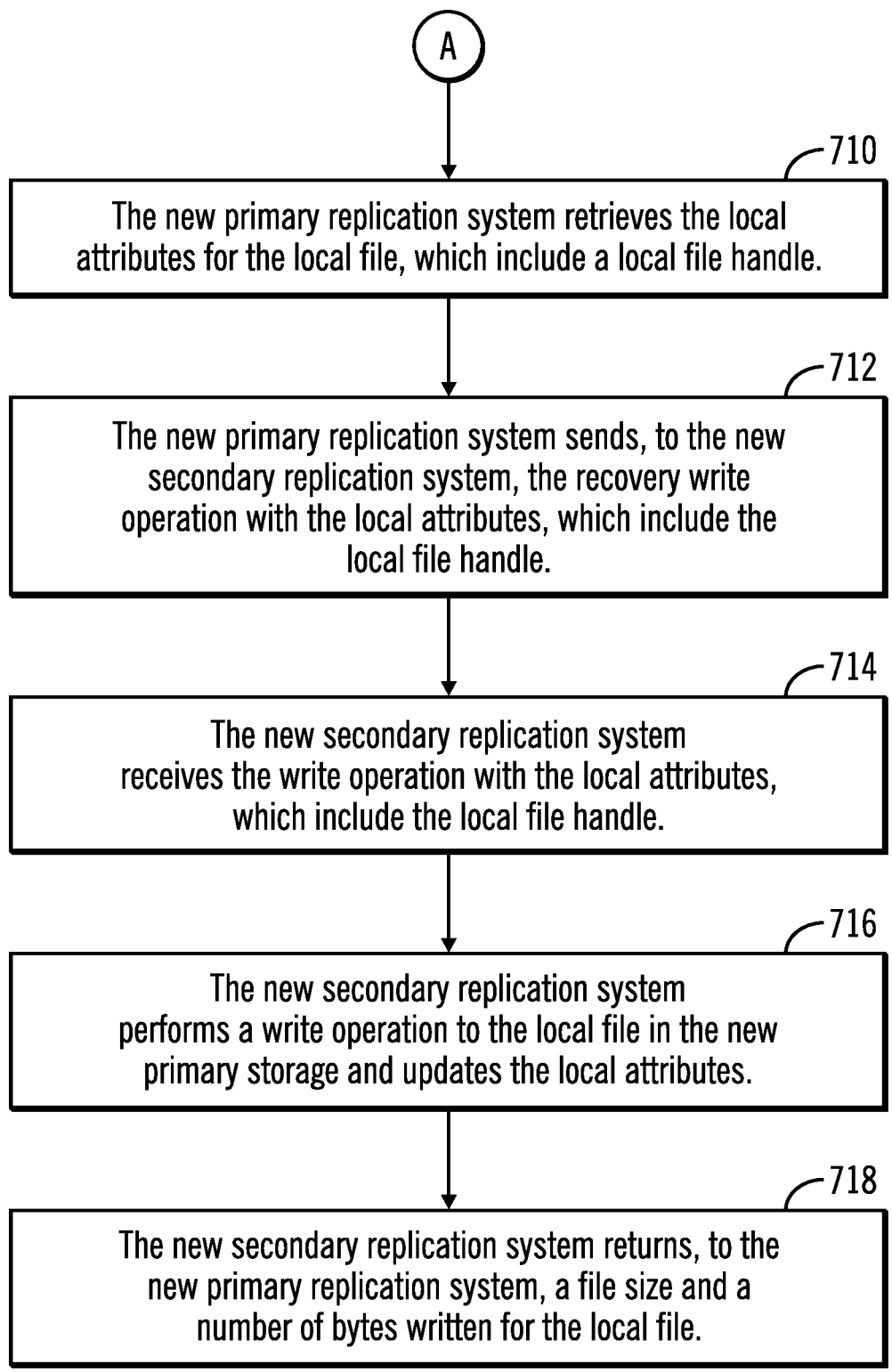

FIGS. 7A and 7B illustrate, in a flowchart, operations for a role reversal and processing of a recovery write operation in accordance with certain embodiments. In block 700, roles are reversed with the original primary site becoming the new secondary site, and the original secondary site becoming the new primary site, where the new primary site processes I/O operations. In block 702, the new primary replication system at the new primary storage controller self-mounts a local copy as read only in order to generate reliable file handles.

In block 704, the new primary replication system at the new primary storage controller determines that the new secondary replication system at the new secondary storage controller comes back up, with the data available in the new secondary storage from just before the roles being reversed.

In block 706, the new primary replication system determines that a recovery write operation is triggered on a remote file due to data changes on the remote file at the new primary storage. In block 708, the new primary replication system performs the recovery write operation on the remote file in the new primary storage and updates the remote attributes. In certain embodiments, writing to a remote file may result in one or more of the following remote attributes changing: the file size, the access time, the modification time (mtime), and the change time. Also, the create indicator (e.g., a bit) and the dirty indicator (e.g., a bit) may be updated. From block 708 (FIG. 7A), processing continues to block 710 (FIG. 7B).

In block 710, the new primary replication system retrieves the local attributes for the local file (stored in the remote inode's remote extended attributes), which include a local file handle for the local file. In block 712, the new primary replication system sends, to the new secondary replication system, the recovery write operation on the local file with the local attributes, which include the local file handle for the local file. In block 714, the new secondary replication system receives the write operation with the local attributes, which include the local file handle for the local file. In particular, the new secondary replication is able to access the local file in the new secondary storage using this local file handle.

In block 716, the new secondary replication system performs a write operation to the local file in the new primary storage and updates the local attributes. In certain embodiments, writing to a local file may result in one or more of the following local attributes changing: the file size, the access time, the modification time (mtime), and the change time. Also, the create indicator (e.g., a bit) and the dirty indicator (e.g., a bit) may be updated. In block 718, the new secondary replication system returns, to the new primary replication system, the file size and a number of bytes written for the local file. The new primary replication system stores the file size and the number of bytes written for the local file. The file size of the local file may be compared with the file size of the remote file to determine whether they are in sync.

In certain embodiments, the operations of blocks 706-718 occur to process one or more recovery write operations for changed files at the new primary site, where these files changed after the role reversal.

Figure 8:
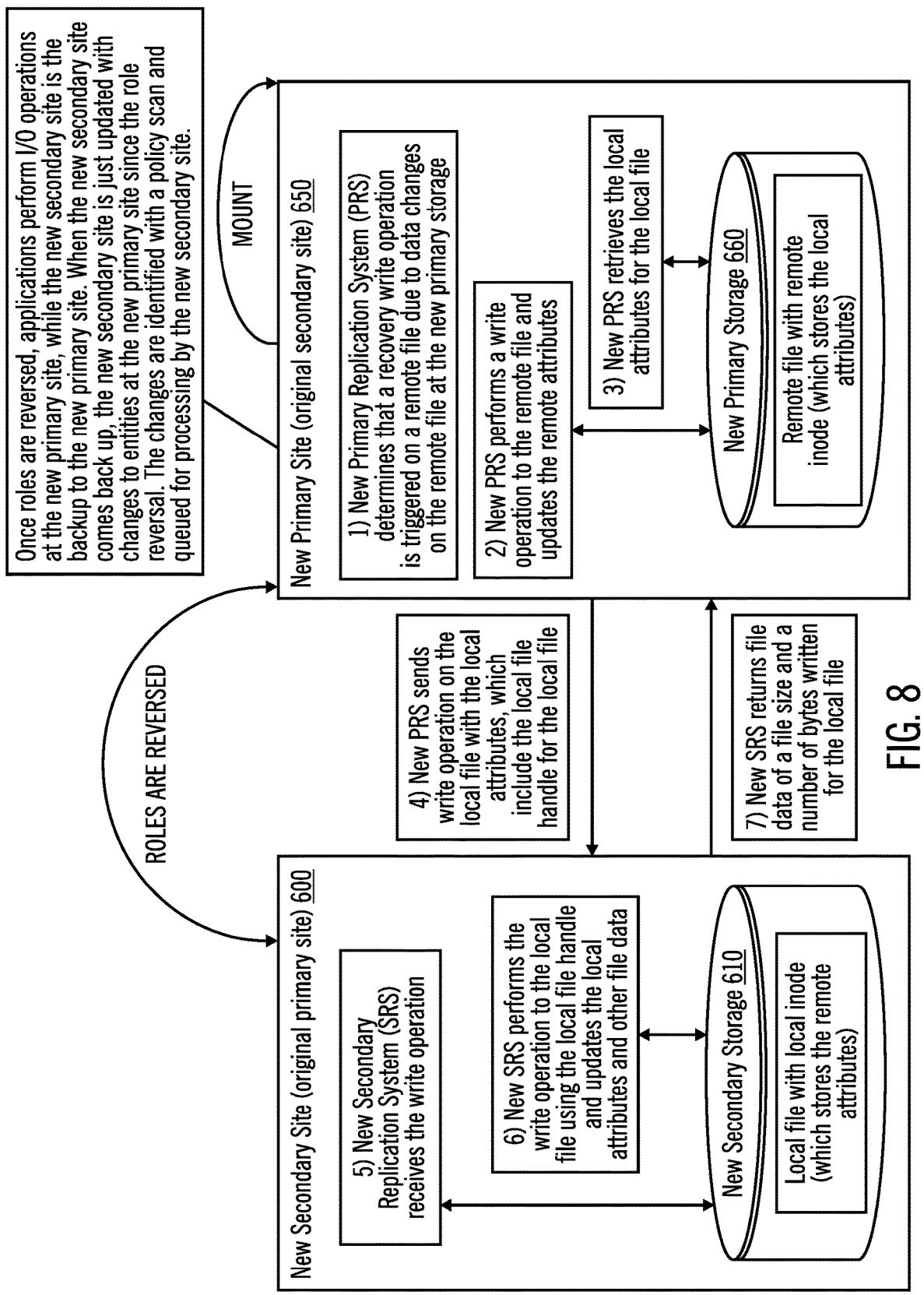
FIG. 8 illustrates, in a block diagram, for a role reversal and processing of a recovery write operation in accordance with certain embodiments.

FIG. 8 illustrates, in a block diagram, for a first role reversal and processing of a recovery write operation in accordance with certain embodiments. In particular, FIG. 8 illustrates the operations of FIGS. 7A and 7B in accordance with certain embodiments.

Figure 9A:
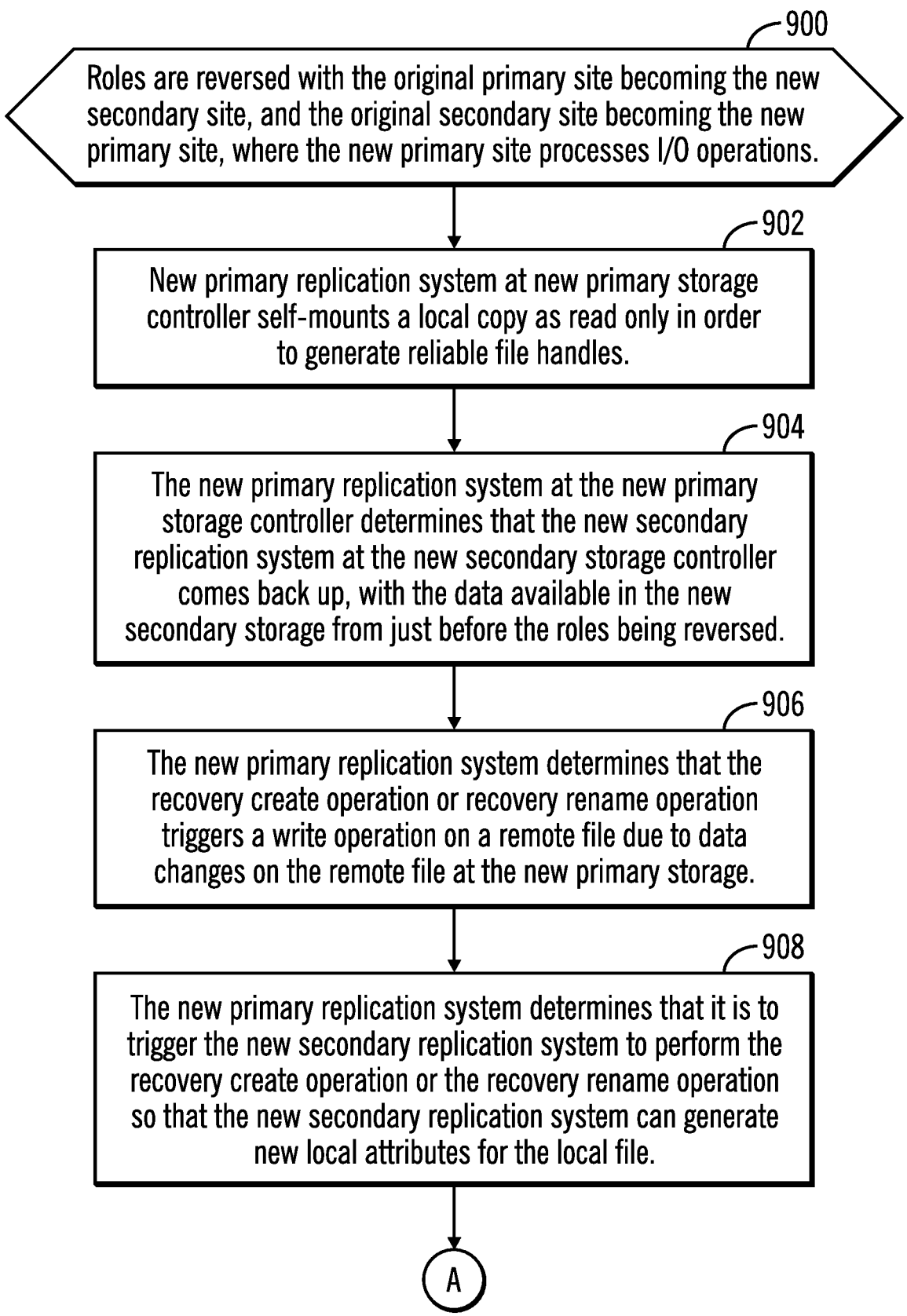
FIGS. 9A, 9B, and 9C illustrate, in a flowchart, operations for a role reversal and processing of a recovery create operation or a recovery rename operation in accordance with certain embodiments.
Figure 9B:
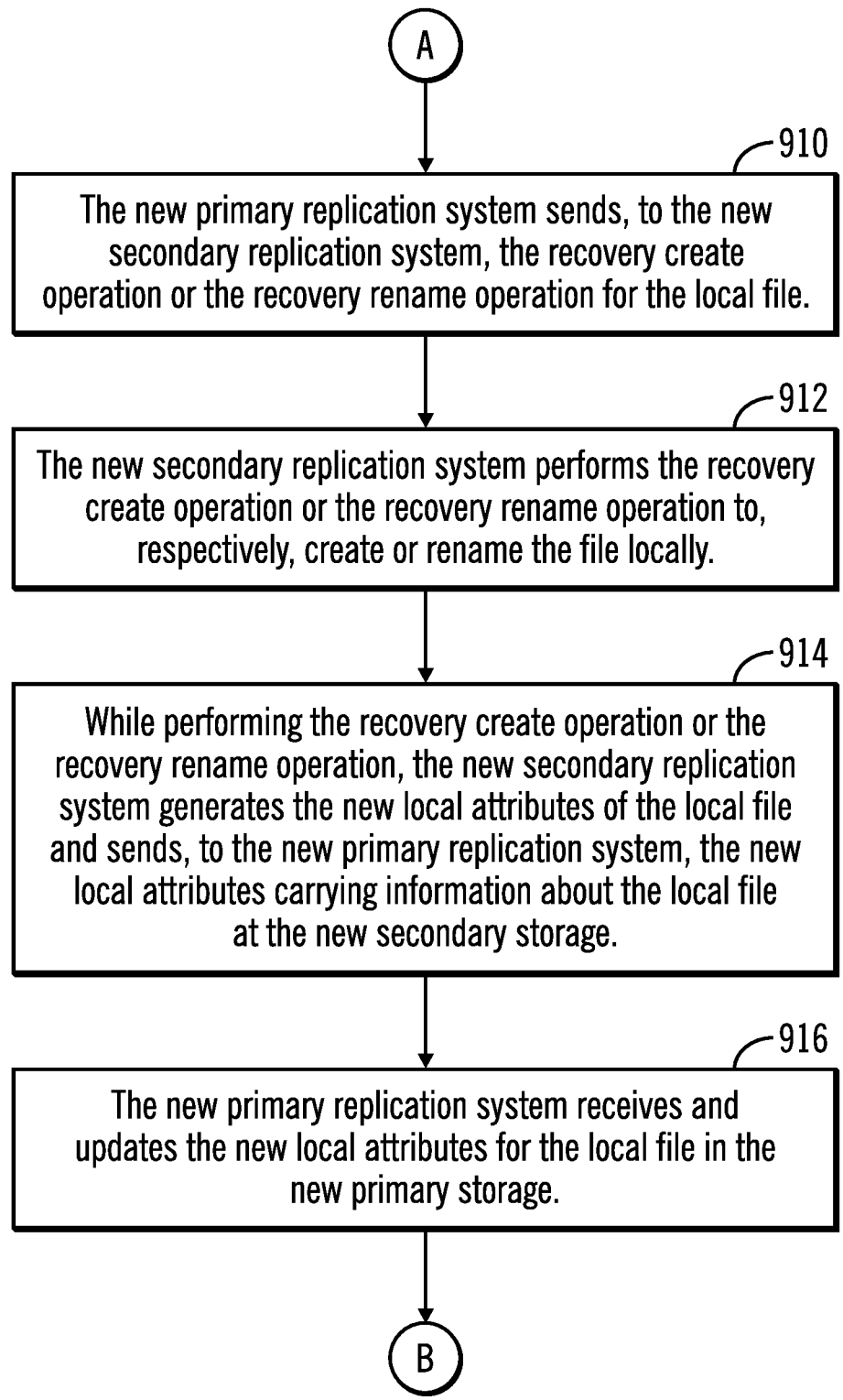
Figure 9C:
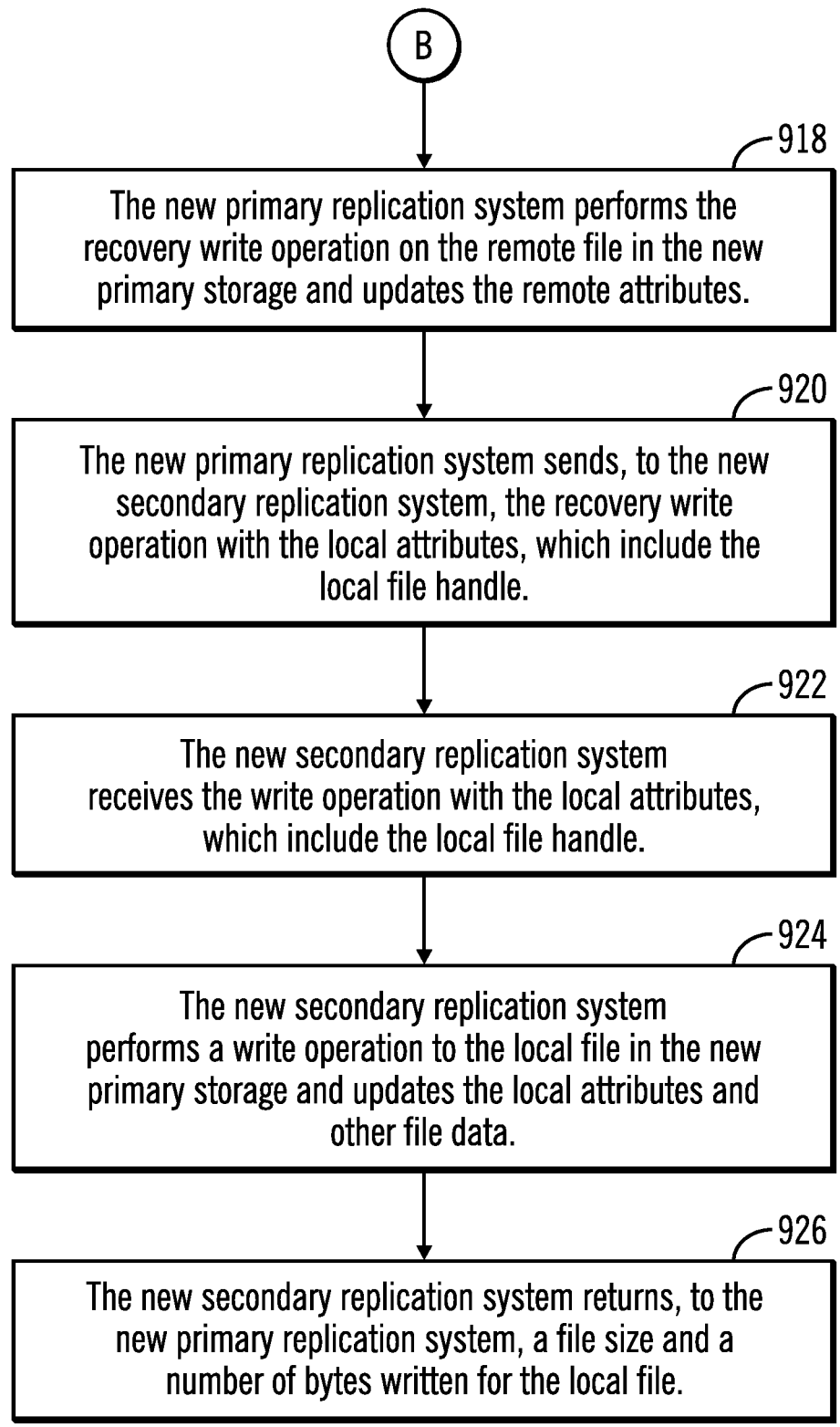

FIGS. 9A, 9B, and 9C illustrate, in a flowchart, operations for a role reversal and processing of a recovery create operation or a recovery rename operation in accordance with certain embodiments. In block 900, roles are reversed with the original primary site becoming the new secondary site, and the original secondary site becoming the new primary site, where the new primary site processes I/O operations. In block 902, the new primary replication system at the new primary storage controller self-mounts a local copy as read only in order to generate reliable file handles.

In block 904, the new primary replication system at the new primary storage controller determines that the new secondary replication system at the new secondary storage controller comes back up, with the data available in the new secondary storage from just before the roles being reversed.

In block 906, the new primary replication system determines that a recovery create operation or recovery rename operation triggers a write operation on a remote file due to data changes on the remote file at the new primary storage. In block 908, the new primary replication system determines that it is to trigger the new secondary replication system to perform the recovery create operation or the recovery rename operation so that the new secondary replication system can generate new local attributes for the local file. From block 908 (FIG. 9A), processing continues to block 910 (FIG. 9B).

In block 910, the new primary replication system sends, to the new secondary replication system, the recovery create operation or the recovery rename operation for the local file.

In block 912, the new secondary replication system performs the recovery create operation or the recovery rename operation to, respectively, create or rename the file locally. In block 914, while performing the create operation or the rename operation, the new secondary replication system generates the new local attributes of the local file and sends, to the new primary replication system, the new local attributes carrying information about the local file at the new secondary storage. In 916, the new primary replication system receives and updates the new local attributes for the local file in the new primary storage. In particular, the new primary replication system updates the local attributes stored in the remote extended attributes portion of the remote inode. From block 916 (FIG. 9B), processing continues to block 918 (FIG. 9C).

In block 918, the new primary replication system performs the recovery write operation on the remote file in the new primary storage and updates the remote attributes. In block 920, the new primary replication system sends, to the new secondary replication system, the recovery write operation with the local attributes, which include the local file handle. In block 922, the new secondary replication system the write operation with the local attributes, which include the local file handle. In block 924, the new secondary replication system performs a write operation to the local file in the new primary storage and updates the local attributes and other file data. In block 926, the new secondary replication system returns, to the new primary replication system, a file size and a number of bytes written for the local file.

In certain embodiments, the operations of blocks 906-926 occur to process a recovery create operation or a recovery rename operation for each of the changed files at the new primary site, where these files changed after the role reversal.

Figure 10:
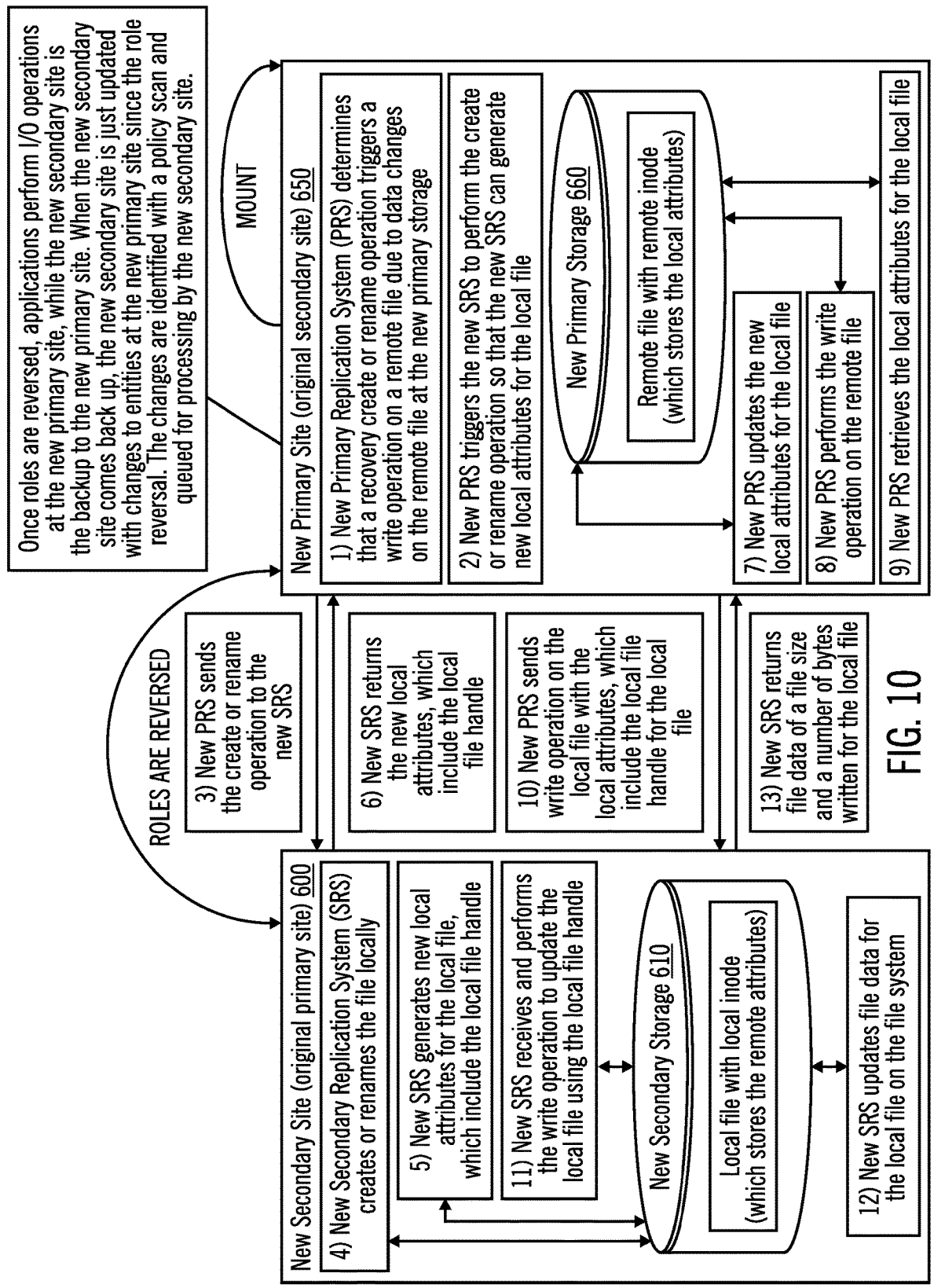
FIG. 10 illustrates in a block diagram, operations for a role reversal and processing of a recovery create operation or a recovery rename operation in accordance with certain embodiments.

FIG. 10 illustrates in a block diagram, operations for a role reversal and processing of a recovery create operation or a recovery rename operation in accordance with certain embodiments. In particular, FIG. 10 illustrates the operations of FIGS. 9A, 9B, and 9C in accordance with certain embodiments.

Figure 11:
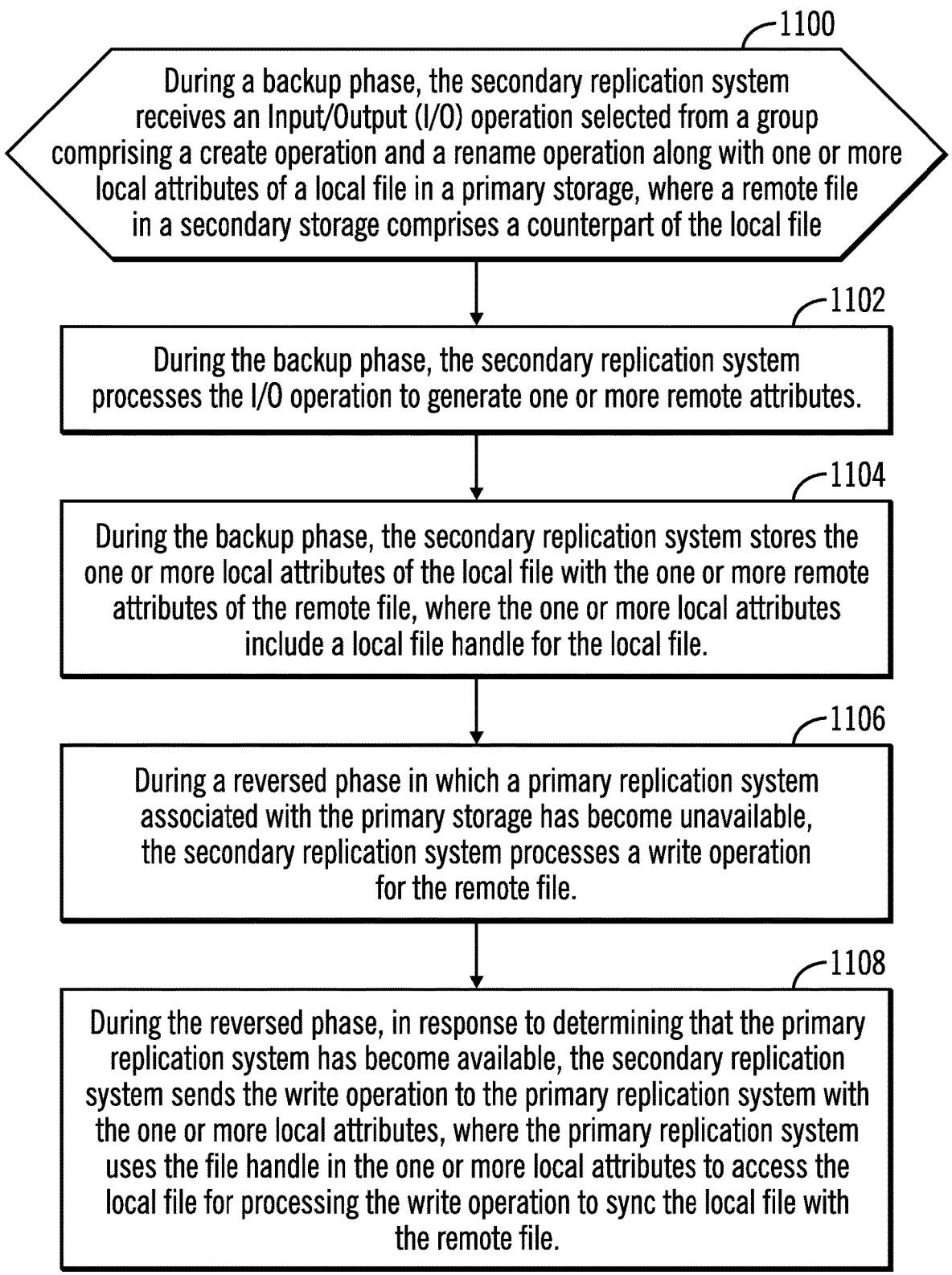
FIG. 11 illustrates, in a flowchart, operations performed by a secondary replication system at a secondary site in accordance with certain embodiments.

FIG. 11 illustrates, in a flowchart, operations performed by a secondary replication system at a secondary site in accordance with certain embodiments. In block 1100, during a backup phase, the secondary replication system receives an operation selected from a group comprising a create operation and a rename operation along with one or more local attributes of a local file in a primary storage, where a remote file in a secondary storage comprises a counterpart of the local file. In block 1102, during the backup phase, the secondary replication system processes the operation (e.g., creates the file for a create operation and renames the file for a rename operation) to generate one or more remote attributes. In block 1104, during the backup phase, the secondary replication system stores the one or more local attributes of the local file with the one or more remote attributes of the remote file, wherein the one or more local attributes include a local file handle for the local file.

In block 1106, during a reversed phase in which a primary replication system associated with the primary storage has become unavailable, the secondary replication system processes a write operation for the remote file. In block 1108, during the reversed phase, in response to determining that the primary replication system has become available, the secondary replication system sends the write operation to the primary replication system with the one or more local attributes, wherein the primary replication system uses the file handle in the one or more local attributes to access the local file for processing the write operation to sync the local file with the remote file.

With embodiments, the one or more local attributes are stored as remote extended attributes in a remote inode of the remote file. In certain embodiments, the local file handle is stored in the secondary storage in response to receiving an operation on a control file.

In certain embodiments, the local file is a first local file, the remote file is a first remote file, and, during the reversed phase, the secondary replication system receives another operation selected from the group comprising the create operation and the rename operation for a second remote file, which is a counterpart to a second local file. The secondary replication system sends the another operation to the primary replication system. The secondary replication system receives one or more local attributes for the second local file, where the one or more local attributes include a local file handle for the second local file. The secondary replication system sends another write operation to the primary replication system with the one or more local attributes of the second file, wherein the primary replication system uses the file handle in the one or more local attributes of the second local file to access the second local file for processing the write operation to sync the second local file with the second remote file.

In certain embodiments, the operations that were processed for files in the secondary storage during the reversed phase are sent to the primary replication system. Then, in response to the operations being processed by the primary replication system, a role reversal is performed.

Embodiments reduce dependency on snapshots when the original primary site comes back up. In particular, embodiments generate file handles natively for local attributes that are to be saved with a remote counterpart file object, thereby reducing dependency on snapshots.

Embodiments reduce memory requirements on the reverse relationships gateway node. Embodiments provide a special write call on the control file to be able to transmit the file handle generated from the original production site to the original secondary site.

Embodiments are able to generate file handles natively for that are to be set on the remote counterpart. Embodiments generate file handles based on an inode number and a generation number for a native backend (outside any protocol), where both the primary and secondary sites use a same file system.

Embodiments provide no data loss and close to zero downtime for a planned role reversal. Embodiments start a replication process for new incoming requests (since the role reversal) in case of planned role reversal, thereby avoiding creation of snapshots.

Embodiments provide minimal (least possible data loss) in case of an unplanned role reversal (e.g., a back-to-back failure). With embodiments, minutes or hours' worth of data may be lost, as compared to days or weeks' worth of data (for billions of inodes) in other scenarios. With an unplanned role reversal, just the changed entries at the new primary site (original secondary site) are sent to the new secondary site (original primary site).

Embodiments automatically transmit the local attributes of a primary site to counterpart files/objects of a secondary site during normal backup, and, after a role reversal, once a failed primary site is back up, embodiments transmit delta changes made at the new primary site (original secondary site) to the new secondary site (original primary site).

Figure 12:
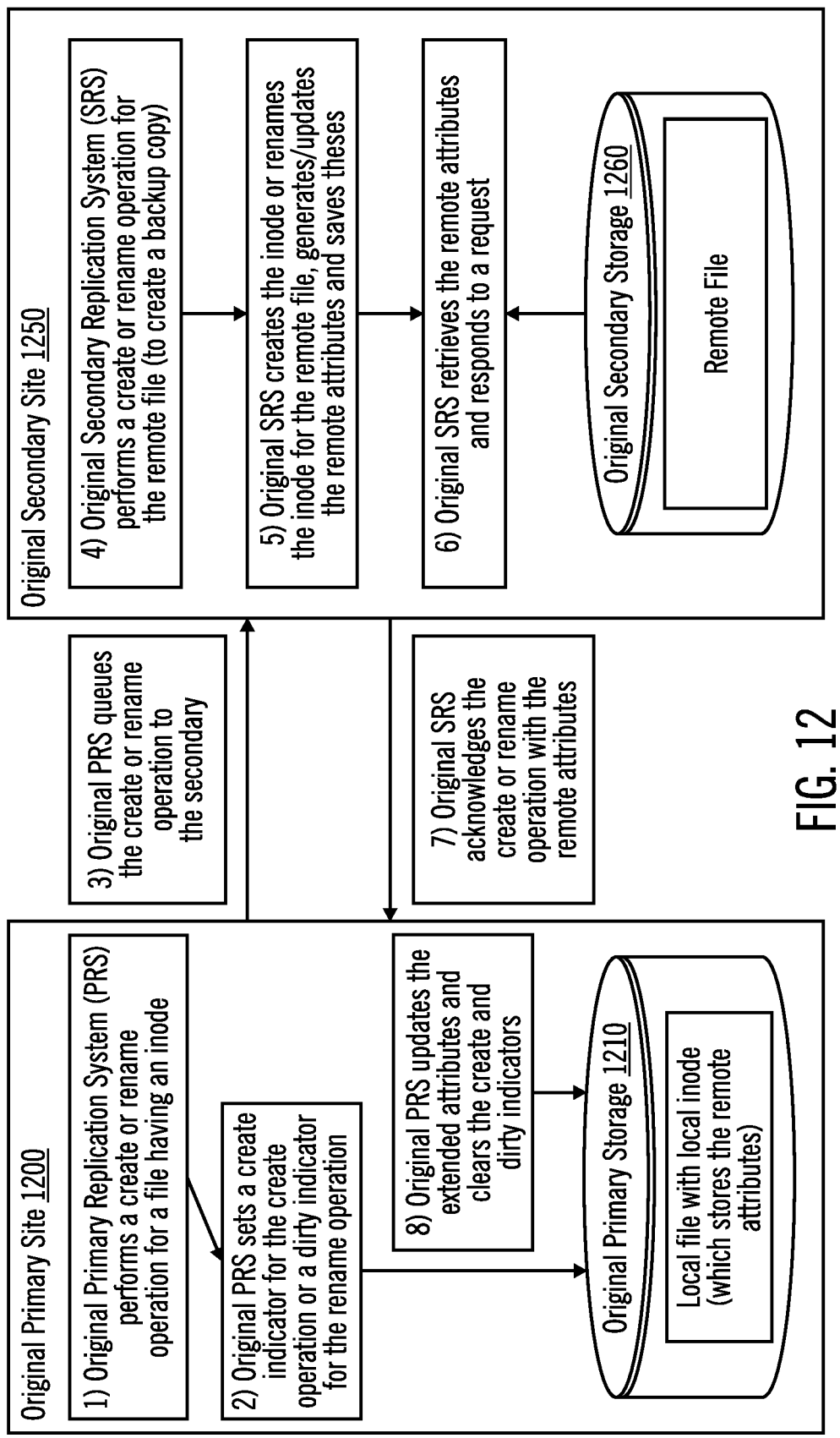
FIG. 12 illustrates, in a block diagram, operations for an original primary site replicating data, without local attributes, to an original secondary site in accordance with certain embodiments.
Figure 13:
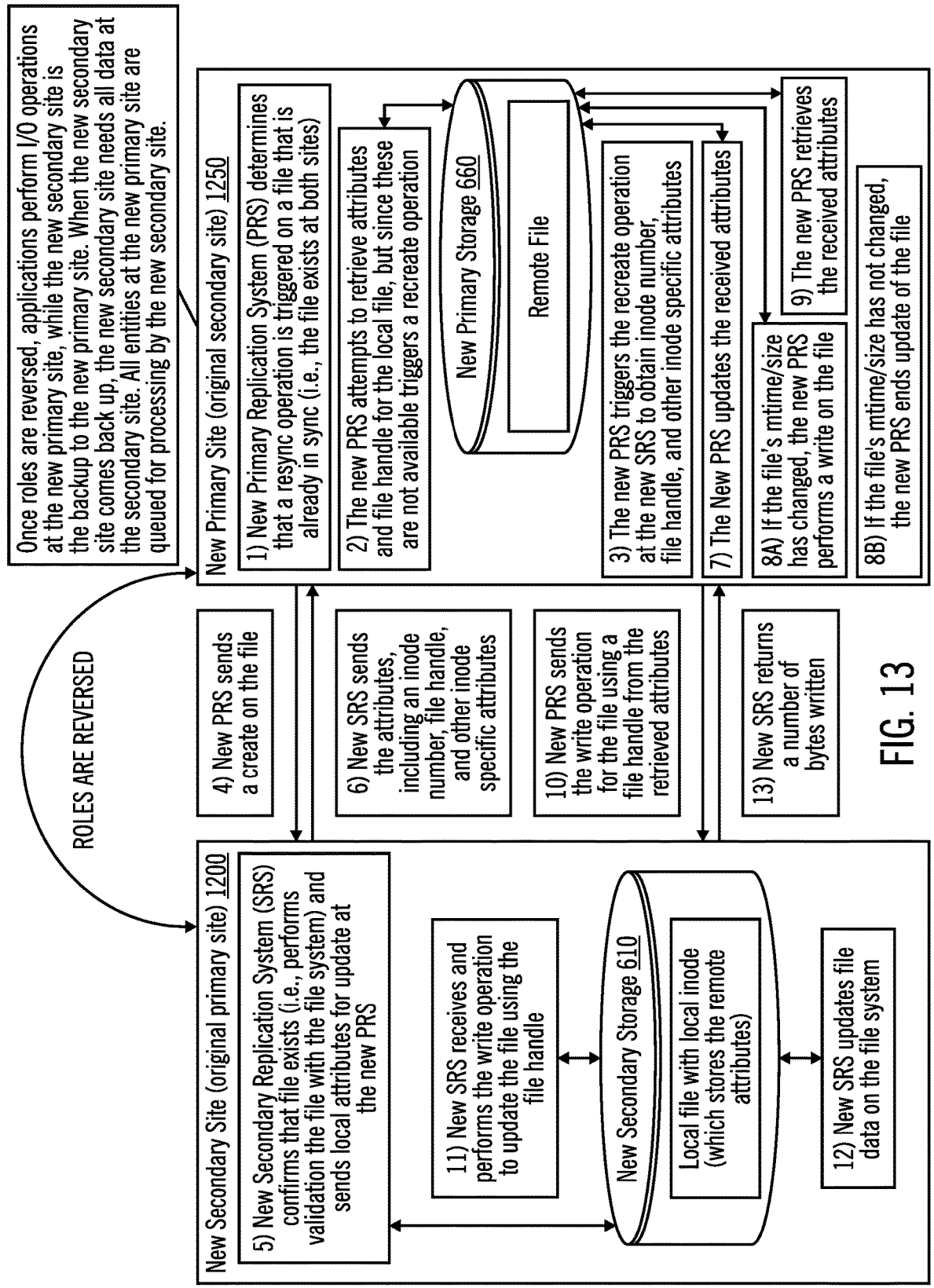
FIG. 13 illustrates, in a block diagram, operations for a role reversal and processing of a resync operation on a file that is not already in sync in accordance with certain embodiments.
Figure 14:
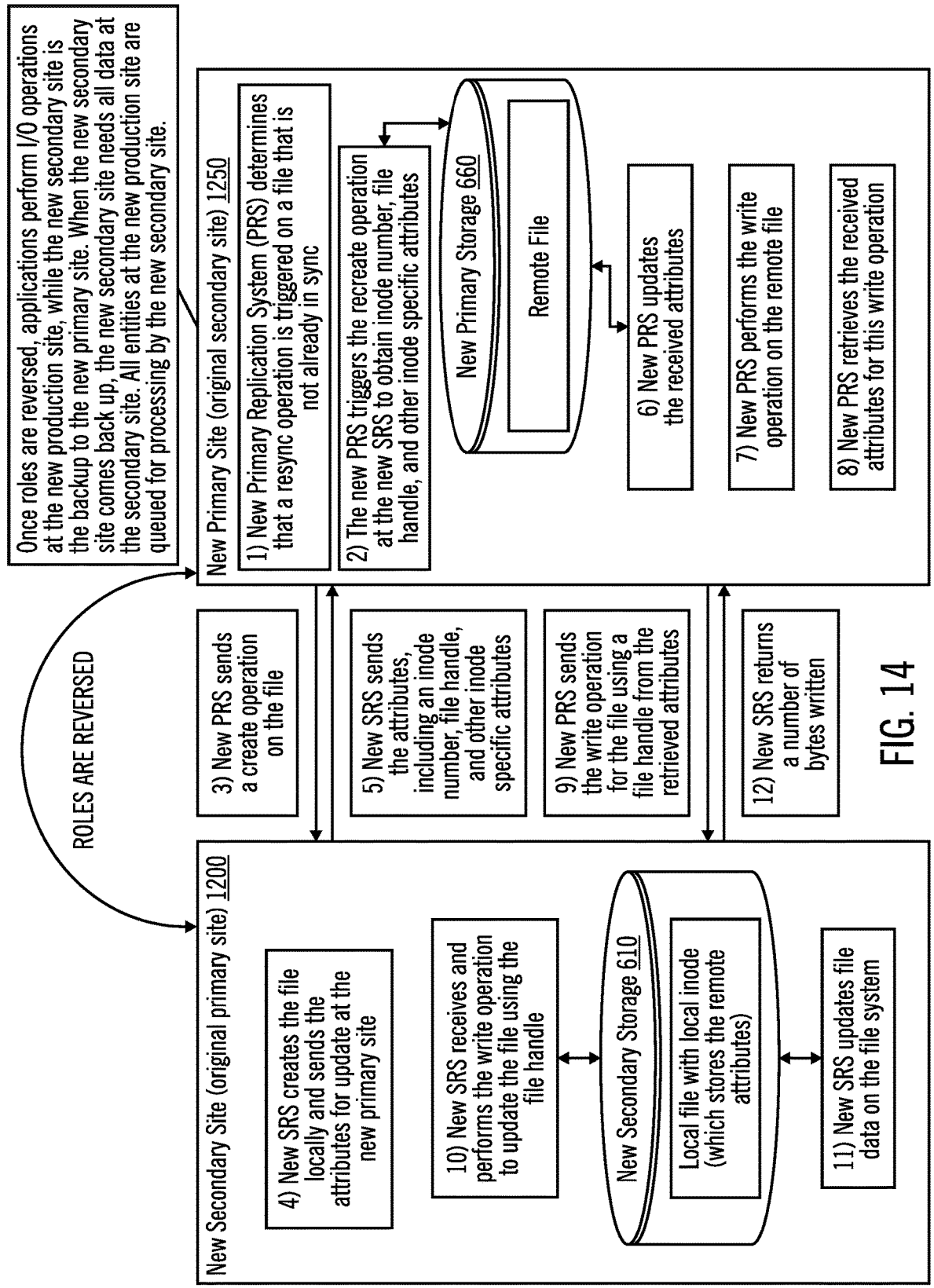
FIG. 14 illustrates, in a block diagram, operations for a role reversal and processing of a resync operation on a file that is not already in sync in accordance with certain embodiments.

On the other hand, when an original primary site goes down and comes back up, without having data saved from before the role reversal, then the operations of FIGS. 12-14 are performed.

FIG. 12 illustrates, in a block diagram, operations for an original primary site 1200 replicating data, without extended attributes, to an original secondary site 1250 in accordance with certain embodiments. In this embodiment, the original secondary storage does not store the local attributes. With embodiments, the original primary site may come back from the outage and be ready to take the delta changes from the new primary site (original secondary site). In such cases, a role reversal is performed, where the original primary site comes back as the new secondary site, while the original secondary site is the new primary site. Applications are making changes to data at the new primary site, and these changes are migrated to the new secondary site.

FIG. 13 illustrates, in a block diagram, operations for a role reversal and processing of a resync operation on a file that is not already in sync in accordance with certain embodiments. In certain embodiments, the operations of blocks 1-13 occur for each file in the new primary storage that is not already in sync. FIG. 14 illustrates, in a block diagram, operations for a role reversal and processing of a resync operation on a file that is not already in sync in accordance with certain embodiments. In certain embodiments, the operations of blocks 1-12 occur for each file in the new primary storage that is not already in sync.

In this role reversal case, the new primary site queues changes at the primary site and verifies with the new secondary site (the original primary site) as to how much of the data is intact with it. If the file size and the file's last modification time (mtime) on the file match between the sites, then that means that the file is intact on both sites. Then, a write operation may be dropped for the file (to write from the new primary site to the new secondary site), and the next file may be processed. The queue in which the bulk of these write operations are queued for verification with the new secondary site is termed the priority queue. This priority queue is where the operations during the role reversal procedure from the new primary site get queued. Any following operations on the new primary site are queued on to the normal queue, which waits for any operations on the priority queue to be completed before the normal queue operations are processed (get flushed).

The idea behind queueing up operations from the new primary site to the priority queue has two purposes. First, whether the set of file objects are intact with the new secondary site is verified, but, also, remote (original secondary) file handles of the file objects' counterparts at the new secondary site (if the file handles do not exist) are recreated at the new secondary site and these remote file handles are stored and sent to the new primary site. The file handles are used in disaster recovery for follow up operations on the given file.

When verifying all files (rather than just sending changes), from the new primary site to the new secondary site, there may be many file objects (e.g., billions) queued on the priority queue to build the remote file handles. This may use memory (e.g., 1 KB of memory for each of the queue operations, which, for a billion inodes may be 1 TB of memory to hold the priority queue). Embodiments may use demand-based queueing, where the priority queue is populated once some of the existing operations on the priority queue are processed to make room for new operations.

While the priority queue is being flushed (processed), the normal queue may be idle, although applications may queue operations on file objects. It may take some time for the priority queue to be flushed (e.g., if the priority queue operations are flushed at 1000 operations per second, with parallelization, this may translate to several days (e.g., 12 days) for the priority queue to be flushed). Then, the normal queue is flushed, which will process the several days (e.g., 12 days) of normal queue data to sync the sites.

In some scenarios, role reversal of the sites are planned to test the sanity of the original secondary site by failing over applications from the original primary site to the original secondary site, which becomes the new primary site. Then, the applications are executed at the new primary site. Later, there may be another role reversal so that the applications run on the original primary again.

With copying over changes (block 410), embodiments provide faster role reversal, without having to queue all the operations there are at the new primary site and just having to queue the delta of changes that were made after promoting the original secondary site to the new primary site.

With embodiments, both the planned and unplanned role reversal procedures for copying all data mainly involve: creation of a new snapshot, a policy scan to identify all inodes on the new secondary site and queue operations to verify the inodes (whether or not they changed), deletion of the snapshot (which performs a copy-over operation to other snapshots and removes inodes/data before releasing the snapshot).

In particular, in case of the planned/unplanned role reversal procedures, they is a complete re-sync on all inodes to verify each queued operation and determine whether there have been changes to each inode on the new primary site. If there have been changes to an inode, the new primary site sends the file data to the new secondary site to update local indoe with remote attributes (including a file handle for the inode). If there have not been changes to the inode, the data operation on the file gets skipped, but the new secondary site updates the remote attributes (including a file handle for the inode).

This technique also involves having consistent RPO snapshots between both sites and starting a failback procedure at the original production site, which has come back after disaster. This would roll back the fileset/filesystem to the last in-sync RPO snapshot between the sites, with a complete restore on the fileset/filesystem from the snapshot. Also, this technique creates a new matching snapshot on the new primary site. This technique runs a snapdiff procedure to generate the difference in operations between the two snapshots (the last RPO snapshot that matches between the original and new primary sites), and the snapdiff is a sequence of operations that the original primary site performs on itself to get close to the new primary site (i.e., to catch up data changes). This technique stops applications at the new primary site and runs one last snapdiff procedure to get all differences applied on the original primary site from the new primary site. This technique stops the failback procedure at the original primary site and creates a new RPO to mark the consistency between sites. This technique resumes applications at the original primary site that has been restored.

Figure 15:
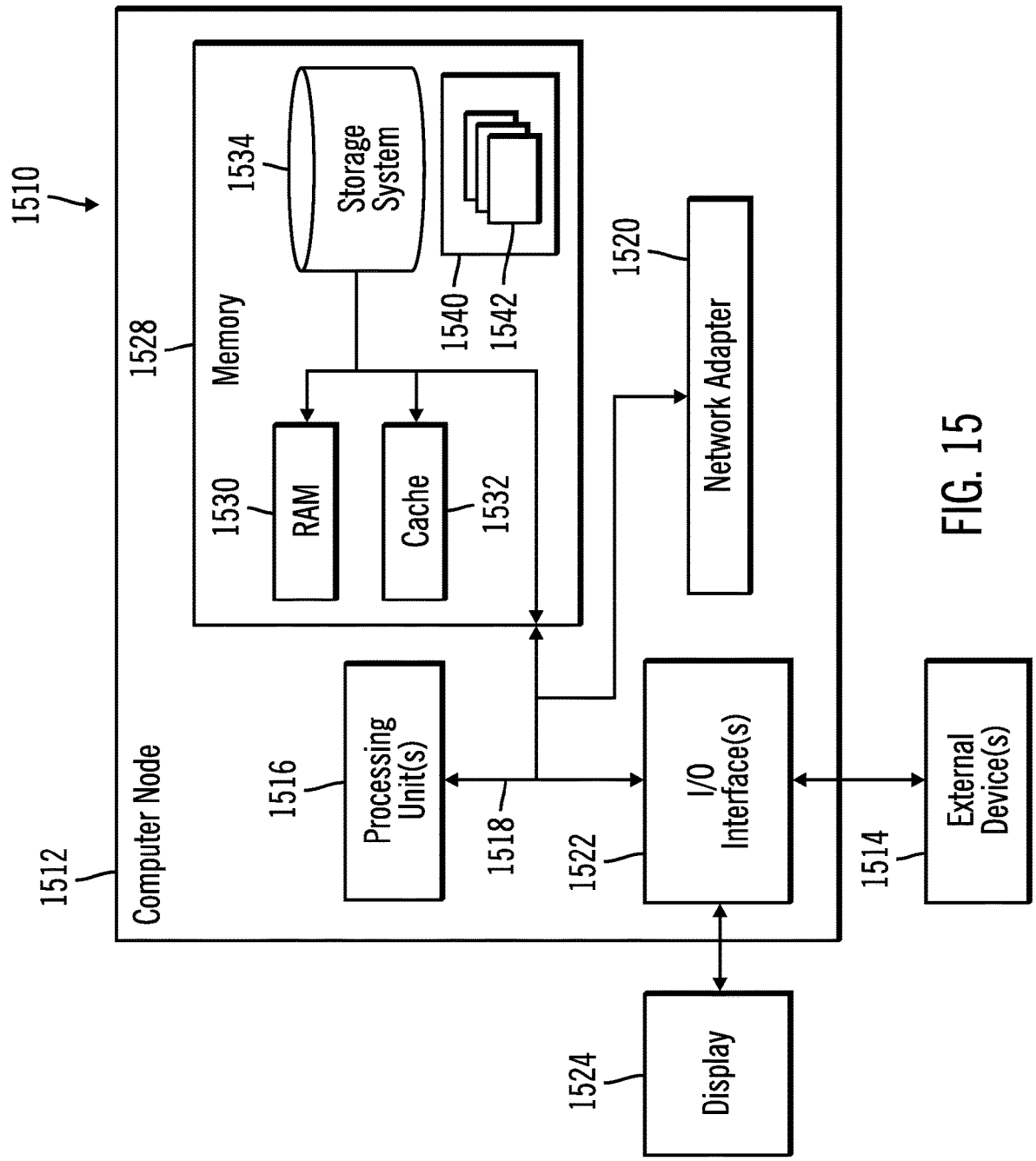
FIG. 15 illustrates a computing node in accordance with certain embodiments.

FIG. 15 illustrates a computing environment 1510 in accordance with certain embodiments. In certain embodiments, the computing environment is a cloud computing environment. Referring to FIG. 15, computer node 1512 is only one example of a suitable computing node and is not intended to suggest any limitation as to the scope of use or functionality of embodiments of the invention described herein. Regardless, computer node 1512 is capable of being implemented and/or performing any of the functionality set forth hereinabove.

The computer node 1512 may be a computer system, which is operational with numerous other general purpose or special purpose computing system environments or configurations. Examples of well-known computing systems, environments, and/or configurations that may be suitable for use with computer node 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1512 may be described in the general context of computer system executable instructions, such as program modules, being executed by a computer system. Generally, program modules may include routines, programs, objects, components, logic, data structures, and so on that perform particular tasks or implement particular abstract data types. Computer node 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer node 1512 is shown in the form of a general-purpose computing device. The components of computer node 1512 may include, but are not limited to, one or more processors or processing units 1516, a system memory 1528, and a bus 1518 that couples various system components including system memory 1528 to one or more processors or processing units 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1512 typically includes a variety of computer system readable media. Such media may be any available media that is accessible by computer node 1512, and it includes both volatile and non-volatile media, removable and non-removable media.

System memory 1528 can include computer system readable media in the form of volatile memory, such as random access memory (RAM) 1530 and/or cache memory 1532. Computer node 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 1518 by one or more data media interfaces. As will be further depicted and described below, system memory 1528 may include at least one program product having a set (e.g., at least one) of program modules that are configured to carry out the functions of embodiments of the invention.

Program/utility 1540, having a set (at least one) of program modules 1542, may be stored in system memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer node 1512 may also communicate with one or more external devices 1514 such as a keyboard, a pointing device, a display 1524, etc.; one or more devices that enable a user to interact with computer node 1512; and/or any devices (e.g., network card, modem, etc.) that enable computer node 1512 to communicate with one or more other computing devices. Such communication can occur via Input/Output (I/O) interfaces 1522. Still yet, computer node 1512 can communicate with one or more networks such as a local area network (LAN), a general wide area network (WAN), and/or a public network (e.g., the Internet) via network adapter 1520. As depicted, network adapter 1520 communicates with the other components of computer node 1512 via bus 1518. It should be understood that although not shown, other hardware and/or software components could be used in conjunction with computer node 1512. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the primary storage controller 120a and the secondary storage controller 120b each has the architecture of computer node 1510. In certain embodiments, the primary storage controller 120a and/or the secondary storage controller 120b are part of a cloud infrastructure. In certain alternative embodiments, the primary storage controller 120a and/or the secondary storage controller 120b are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique file objects but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
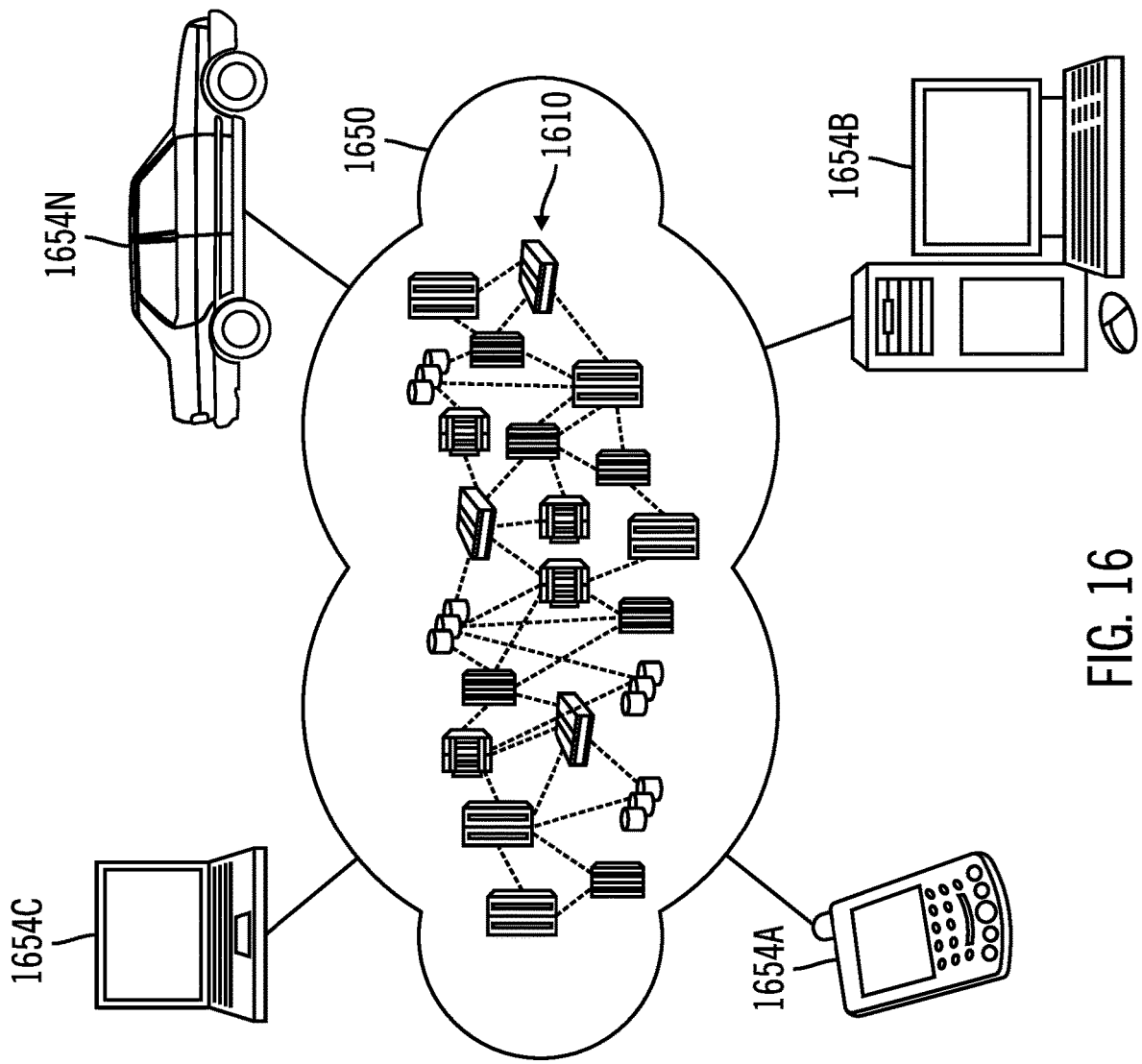
FIG. 16 illustrates a cloud computing environment in accordance with certain embodiments.

Referring now to FIG. 16, illustrative cloud computing environment 1650 is depicted. As shown, cloud computing environment 1650 includes one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Figure 17:
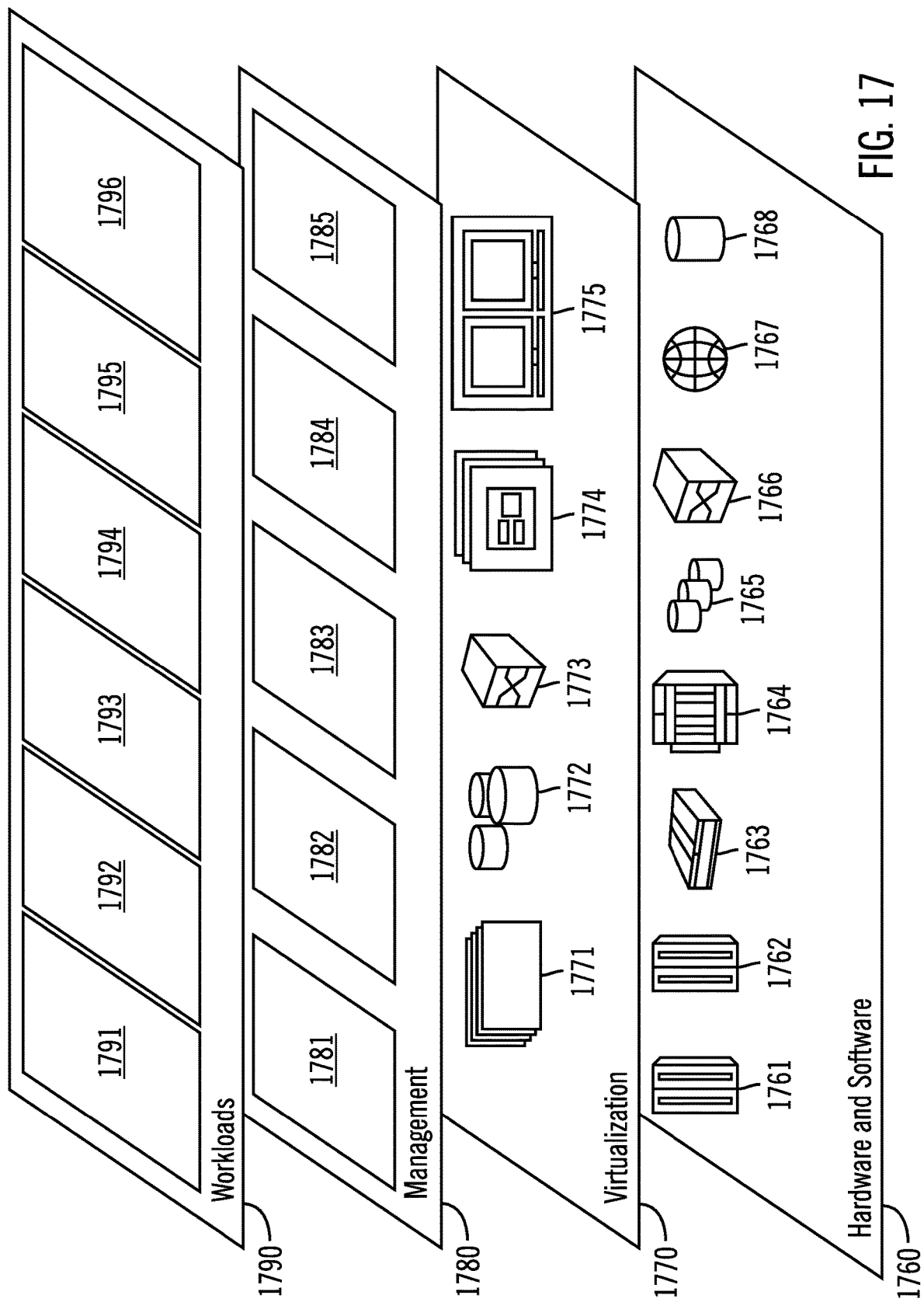
FIG. 17 illustrates abstraction model layers in accordance with certain embodiments.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include: mainframes 1761; RISC (Reduced Instruction Set Computer) architecture based servers 1762; servers 1763; blade servers 1764; storage devices 1765; and networks and networking components 1766. In some embodiments, software components include network application server software 1767 and database software 1768.

Virtualization layer 1770 provides an abstraction layer from which the following examples of virtual entities may be provided: virtual servers 1771; virtual storage 1772; virtual networks 1773, including virtual private networks; virtual applications and operating systems 1774; and virtual clients 1775.

In one example, management layer 1780 may provide the functions described below. Resource provisioning 1781 provides dynamic procurement of computing resources and other resources that are utilized to perform tasks within the cloud computing environment. Metering and Pricing 1782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1783 provides access to the cloud computing environment for consumers and system administrators. Service level management 1784 provides cloud computing resource allocation and management such that required service levels are met. Service Level Agreement (SLA) planning and fulfillment 1785 provide pre-arrangement for, and procurement of, cloud computing resources for which a future requirement is anticipated in accordance with an SLA.

Workloads layer 1790 provides examples of functionality for which the cloud computing environment may be utilized. Examples of workloads and functions which may be provided from this layer include: mapping and navigation 1791; software development and lifecycle management 1792; virtual classroom education delivery 1793; data analytics processing 1794; transaction processing 1795; and role reversal of primary and secondary sites with minimal replication delay 1796.

Thus, in certain embodiments, software or a program, implementing role reversal of primary and secondary sites with minimal replication delay in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer program product, the computer program product comprising a computer readable storage medium having program code embodied therewith, the program code executable by at least one processor to perform:
    under control of a secondary replication system;
        during a backup phase,
            receiving an Input/Output (I/O) operation and one or more local attributes of a local file in a primary storage, wherein a remote file in a secondary storage comprises a counterpart of the local file, wherein the local attributes comprise a local inode number, a local generation number, and a local file handle generated at a primary replication system, and wherein the I/O operation is a create operation or a rename operation;
            processing the I/O operation to generate one or more remote attributes; and
            storing the one or more local attributes of the local file with the one or more remote attributes of the remote file, wherein the one or more local attributes include the local file handle for the local file; and
        during a reversed phase in which the primary replication system associated with the primary storage has become unavailable,
            processing a write operation for the remote file;
            determining that the primary replication system has become available; and
            sending the write operation to the primary replication system with the one or more local attributes, wherein the primary replication system uses the local file handle in the one or more local attributes to access the local file for processing the write operation to sync the local file with the remote file.

2. The computer program product of claim 1, wherein the one or more local attributes are stored as remote extended attributes in a remote inode of the remote file.

3. The computer program product of claim 1, wherein the local file handle is stored in the secondary storage in response to receiving an I/O operation on a control file.

4. The computer program product of claim 1, wherein the local file is a first local file, wherein the remote file is a first remote file, and wherein the program code is executable by the at least one processor to perform:
- during the reversed phase, receiving another I/O operation selected from the group comprising the create operation and the rename operation for a second remote file, which is a counterpart to a second local file;
- sending the another I/O operation to the primary replication system; receiving one or more local attributes for the second local file, wherein the one or more local attributes include a local file handle for the second local file; and
- sending another write operation to the primary replication system with the one or more local attributes of the second remote file, wherein the primary replication system uses the local file handle in the one or more local attributes of the second local file to access the second local file for processing the write operation to sync the second local file with the second remote file.

5. The computer program product of claim 1, wherein I/O operations that were processed for files in the secondary storage during the reversed phase are sent to the primary replication system.

6. The computer program product of claim 5, wherein the program code is executable by the at least one processor to perform: in response to the I/O operations being processed by the primary replication system, performing a role reversal.

7. The computer program product of claim 1, wherein a Software as a Service (SaaS) is configured to perform the program code of the computer program product.

8. A secondary storage controller of a secondary replication system, comprising:
- one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform:
- during a backup phase,
  - receiving an Input/Output (I/O) operation and one or more local attributes of a local file in a primary storage, wherein a remote file in a secondary storage comprises a counterpart of the local file, wherein the local attributes comprise a local inode number, a local generation number, and a local file handle generated at a primary replication system, and wherein the I/O operation is a create operation or a rename operation;
  - processing the I/O operation to generate one or more remote attributes; and
  - storing the one or more local attributes of the local file with the one or more remote attributes of the remote file, wherein the one or more local attributes include the local file handle for the local file; and
- during a reversed phase in which the primary replication system associated with the primary storage has become unavailable,
  - processing a write operation for the remote file;
  - determining that the primary replication system has become available; and
  - sending the write operation to the primary replication system with the one or more local attributes, wherein the primary replication system uses the local file handle in the one or more local attributes to access the local file for processing the write operation to sync the local file with the remote file.

9. The computer system of claim 8, wherein the one or more local attributes are stored as remote extended attributes in a remote inode of the remote file.

10. The computer system of claim 8, wherein the local file handle is stored in the secondary storage in response to receiving an I/O operation on a control file.

11. The computer system of claim 8, wherein the local file is a first local file, wherein the remote file is a first remote file, and wherein the program instructions further perform:
- during the reversed phase, receiving another I/O operation selected from the group comprising the create operation and the rename operation for a second remote file, which is a counterpart to a second local file;
- sending the another I/O operation to the primary replication system; receiving one or more local attributes for the second local file, wherein the one or more local attributes include a local file handle for the second local file; and
- sending another write operation to the primary replication system with the one or more local attributes of the second remote file, wherein the primary replication system uses the local file handle in the one or more local attributes of the second local file to access the second local file for processing the write operation to sync the second local file with the second remote file.

12. The computer system of claim 8, wherein I/O operations that were processed for files in the secondary storage during the reversed phase are sent to the primary replication system.

13. The computer system of claim 12, wherein the program instructions further perform: in response to the I/O operations being processed by the primary replication system, performing a role reversal.

14. The computer system of claim 8, wherein a Software as a Service (SaaS) is configured to perform the program instructions of the computer system.

15. A computer-implemented method, comprising:
under control of a secondary replication system:
- during a backup phase,
  - receiving an Input/Output (I/O) operation and one or more local attributes of a local file in a primary storage, wherein a remote file in a secondary storage comprises a counterpart of the local file, wherein the local attributes comprise a local inode number, a local generation number, and a local file handle generated at a primary replication system, and wherein the I/O operation is a create operation or a rename operation;
  - processing the I/O operation to generate one or more remote attributes; and
  - storing the one or more local attributes of the local file with the one or more remote attributes of the remote file, wherein the one or more local attributes include the local file handle for the local file; and
- during a reversed phase in which the primary replication system associated with the primary storage has become unavailable,
  - processing a write operation for the remote file;
  - determining that the primary replication system has become available; and sending the write operation to the primary replication system with the one or more local attributes, wherein the primary replication system uses the local file handle in the one or more local attributes to access the local file for processing the write operation to sync the local file with the remote file.

16. The computer-implemented method of claim 15, wherein the one or more local attributes are stored as remote extended attributes in a remote inode of the remote file.

17. The computer-implemented method of claim 15, wherein the local file handle is stored in the secondary storage in response to receiving an I/O operation on a control file.

18. The computer-implemented method of claim 15, wherein the local file is a first local file, wherein the remote file is a first remote file, and further comprising:

during the reversed phase, receiving another I/O operation selected from the group comprising the create operation and the rename operation for a second remote file, which is a counterpart to a second local file;

sending the another I/O operation to the primary replication system; receiving one or more local attributes for the second local file, wherein the one or more local attributes include a local file handle for the second local file; and sending another write operation to the primary replication system with the one or more local attributes of the second remote file, wherein the primary replication system uses the local file handle in the one or more local attributes of the second local file to access the second local file for processing the write operation to sync the second local file with the second remote file.

19. The computer-implemented method of claim 15, wherein I/O operations that were processed for files in the secondary storage during the reversed phase are sent to the primary replication system.

20. The computer-implemented method of claim 15, wherein a Software as a Service (SaaS) is configured to perform instructions of the computer-implemented method.

* * * * *